(12) United States Patent
Shimodaira

(10) Patent No.: US 9,829,878 B2
(45) Date of Patent: Nov. 28, 2017

(54) ROBOT, ROBOT SYSTEM, AND ROBOT CONTROL DEVICE

(71) Applicant: Seiko Epson Corporation, Tokyo (JP)

(72) Inventor: Yasuhiro Shimodaira, Matsumoto (JP)

(73) Assignee: Seiko Epson Corporation (JP)

( * ) Notice: Subject to any disclaimer, the term of this patent is extended or adjusted under 35 U.S.C. 154(b) by 23 days.

(21) Appl. No.: 15/131,483

(22) Filed: Apr. 18, 2016

(65) Prior Publication Data

US 2016/0231726 A1    Aug. 11, 2016

Related U.S. Application Data

(63) Continuation of application No. 14/529,364, filed on Oct. 31, 2014, now Pat. No. 9,342,066.

(30) Foreign Application Priority Data

Nov. 1, 2013 (JP) ................................. 2013-228813
Mar. 24, 2014 (JP) ................................. 2014-059822

(51) Int. Cl.
*G05B 19/401* (2006.01)
*B25J 13/08* (2006.01)
*B25J 9/16* (2006.01)

(52) U.S. Cl.
CPC .......... *G05B 19/401* (2013.01); *B25J 9/1694* (2013.01); *B25J 13/085* (2013.01); *B25J 9/1692* (2013.01); *G05B 2219/39058* (2013.01); *G05B 2219/39529* (2013.01); *G05B 2219/40599* (2013.01); *G05B 2219/45058* (2013.01); *G05B 2219/45064* (2013.01); *Y10S 901/02* (2013.01);

(Continued)

(58) Field of Classification Search
CPC ....... B25J 9/1633; B25J 9/1692–9/1694; B25J 13/08–13/088; G05B 19/19; G05B 19/401–19/4015; G05B 2219/40599; G05B 2219/39058; G05B 2219/39024; G05B 2219/40598; G05B 2219/40625; G05B 2219/45058; G05B 2219/45064; G05B 2219/39529; Y10S 901/02; Y10S 901/31; Y10S 901/41; Y10S 901/46; Y10S 901/50
USPC ..... 700/255, 258; 901/2, 31, 33, 41, 46, 50; 318/568.16; 702/41, 94, 95, 150–154
See application file for complete search history.

(56) References Cited

U.S. PATENT DOCUMENTS 4,671,112 A * 6/1987 Kimura .............. G01C 19/5607
                                                      73/504.16
5,021,969 A   6/1991 Okamura et al.
(Continued)

FOREIGN PATENT DOCUMENTS

JP    62-114892 A    5/1987
JP    06-289923 A   10/1994
(Continued)

*Primary Examiner* — Bao Long T Nguyen
(74) *Attorney, Agent, or Firm* — Harness, Dickey & Pierce, P.L.C.

(57) ABSTRACT

A robot includes a robot arm, a force sensor, and a control unit configured to control the operation of the robot art. The control unit initializes the force sensor while the robot arm is moving at uniform speed. It is preferable that the control unit initializes the force sensor while the robot arm is moving at the uniform speed and the amplitude of a detection value of the force sensor is smaller than a threshold.

7 Claims, 15 Drawing Sheets

(52) U.S. Cl.
CPC ............ *Y10S 901/31* (2013.01); *Y10S 901/41* (2013.01); *Y10S 901/46* (2013.01)

(56) References Cited

U.S. PATENT DOCUMENTS

| | | |
|---|---|---|
| 5,509,848 A | 4/1996 | Shimbara |
| 5,963,711 A | 10/1999 | Shimada |
| 6,322,508 B1 | 11/2001 | Goldenberg et al. |
| 2008/0140257 A1 | 6/2008 | Sato et al. |
| 2011/0071436 A1 | 3/2011 | Althoefer et al. |
| 2011/0257787 A1 | 10/2011 | Sato et al. |
| 2014/0025205 A1 | 1/2014 | Inazumi |

FOREIGN PATENT DOCUMENTS

| | | |
|---|---|---|
| JP | 09-103945 A | 4/1997 |
| JP | 09-319420 A | 12/1997 |
| JP | 2005-081477 A | 3/2005 |
| JP | 2008-142810 A | 6/2008 |
| JP | 2009-023047 A | 2/2009 |
| JP | 2011-041992 A | 3/2011 |
| JP | 2011-216050 A | 10/2011 |
| JP | 2012-115912 A | 6/2012 |
| JP | 2014-018931 A | 2/2014 |

\* cited by examiner

ROBOT, ROBOT SYSTEM, AND ROBOT CONTROL DEVICE

CROSS-REFERENCE TO RELATED APPLICATIONS

This is a continuation patent application of U.S. application Ser. No. 14/529,364, filed Oct. 31, 2014, which claims priority to Japanese Patent Application No. 2013-228813 filed Nov. 1, 2013 and Japanese Patent Application No. 2014-059822, filed Mar. 24, 2014. The entire disclosures of these applications are expressly incorporated by reference herein.

BACKGROUND

1. Technical Field

The present invention relates to a robot, a robot system, and a robot control device.

2. Related Art

A robot including a robot arm has been known. A plurality of arm members are coupled via joint sections in the robot arm. For example, a hand is attached to the arm member on the most distal end side as an end effector. The joint sections are driven by motors. The arm members turn according to the driving of the joint sections. The robot performs work for, for example, gripping a target with the hand, moving the target to a predetermined place, and inserting the target into an opening.

A force sensor is provided between the arm member on the most distal end side and the hand. In performing the work, the robot detects a force and a moment with the force sensor and performs impedance control (force control) on the basis of a detection result of the force sensor.

In the force sensor, accuracy of force detection is deteriorated because of a temperature change, an output drift due to a leak current of a circuit, and the like. Therefore, in performing the work, the robot performs zero-point correction (initialization) of the force sensor (see, for example, JP-A-2009-23047 (Patent Literature 1)). According to the zero-point correction of the force sensor, it is possible to improve the accuracy of the force detection.

JP-A-2005-81477 (Patent Literature 2) discloses, as a robot system, an automatic polishing apparatus that performs polishing by moving a polishing tool (a Leutor). The automatic polishing apparatus performs operation for measuring, with a polishing force measuring device (a force sensor), a polishing force applied to the polishing tool, moving the polishing tool on the basis of the measured polishing force, and keeping the polishing force fixed (see paragraph "0014" and FIG. 4 of Patent Literature 2).

However, in the robot in the past, as shown in FIG. 17, as work performed using the force sensor, when the robot arm is moved from a first position to a second position, the target is inserted into the opening, and thereafter the robot arm is moved to a third position, the zero-point correction of the force sensor needs to be performed in a state in which the robot arm is stopped in the first position. Consequently, a cycle time increases in the work performed using the force sensor.

In the robot system described in Patent Literature 2, since the force sensor is present on the Leutor side where a rotating shaft rotates at high speed, a vibration component (noise) caused by the high-speed rotation of the Leutor is superimposed on the polishing force detected by the force sensor. In the case of the rotating polishing tool such as the Leutor, reaction due to a gyro effect, which occurs when an object having an inertial moment is moved, also occurs. Therefore, the polishing tool is moved on the basis of an output value of the force sensor affected by the noise and the reaction is moved. Therefore, the control for keeping the polishing force (the force applied to the target) fixed cannot be accurately performed.

SUMMARY

An advantage of some aspects of the invention is to solve at least a part of the problems described above, and the invention can be implemented as the following application examples or aspects.

Application Example 1

A robot according to this application example includes: a robot arm; a force sensor; and a control unit configured to control the operation of the robot art. The control unit initializes the force sensor while the robot arm is moving at uniform speed.

With this configuration, when work is performed, the initialization of the force sensor is performed during the movement of the robot arm. Therefore, it is possible to reduce a cycle time in work performed using the force sensor.

Application Example 2

In the robot according to the application example described above, it is preferable that the control unit initializes the force sensor while the robot arm is moving at the uniform speed and the amplitude of a detection value of the force sensor is smaller than a threshold.

With this configuration, it is possible to properly initialize the force sensor.

Application Example 3

In the robot according to the application example described above, it is preferable that the control unit initializes the force sensor while the robot arm is moving at the uniform speed and when the amplitude of the detection value of the force sensor is smaller than the threshold.

With this configuration, it is possible to properly initialize the force sensor and further reduce the cycle time.

Application Example 4

In the robot according to the application example described above, it is preferable that the threshold is equal to or smaller than 10 N.

With this configuration, it is possible to properly initialize the force sensor.

Application Example 5

In the robot according to the application example described above, it is preferable that the force sensor is provided in the robot arm, and the control unit determines on the basis of speed of apart of the robot arm in which the force sensor is provided whether the robot arm is moving at the uniform speed.

With this configuration, it is possible to properly initialize the force sensor.

Application Example 6

In the robot according to the application example described above, it is preferable that the control unit determines on the basis of speed of the distal end section of the robot arm whether the robot arm is moving at uniform speed.

With this configuration, it is possible to properly initialize the force sensor.

Application Example 7

A robot system according to this application example includes: a robot including a robot arm and a force sensor; and a control unit configured to control the operation of the robot arm. The control unit initializes the force sensor while the robot arm is moving at uniform speed.

With this configuration, when work is performed, the initialization of the force sensor is performed during the movement of the robot arm. Therefore, it is possible to reduce a cycle time in work performed using the force sensor.

Application Example 8

A robot control device according to this application example is a robot control device that controls the operation of a robot including a robot arm and a force sensor. The robot control device initializes the force sensor while the robot arm is moving at uniform speed.

With this configuration, when work is performed, the initialization of the force sensor is performed during the movement of the robot arm. Therefore, it is possible to reduce a cycle time in work performed using the force sensor.

An aspect of the invention is directed to a robot including: a force sensor; and an arm including a gripping section. The robot brings a machining target gripped by the gripping section into contact with a fixed machining tool to machine the machining target.

With this configuration, in the robot, the force sensor is provided in the robot itself rather than on the machining tool side. Consequently, the robot keeps a contact state of the machining target and the machining tool according to an output value of the force sensor on which noise is not superimposed. Therefore, it is possible to provide the robot that can accurately keep a force applied to the machining target fixed.

In the aspect of the invention, to set the output value of the force sensor to a predetermined value set in advance, the robot may keep a state in which the machining target and the machining tool are set in contact with each other.

With this configuration, to set the output value of the force sensor to the predetermined value set in advance, control for keeping the state in which the machining target and the machining tool are set in contact with each other is performed. Consequently, it is possible to provide the robot that can accurately keep the force applied to the machining target fixed.

In the aspect of the invention, in the robot, the machining target may be a workpiece gripped by the gripping section of the robot. The machining tool may be a rotating tool. The machining target may be brought into contact with a polishing tool attached to a rotating shaft of the rotating tool.

With this configuration, control for keeping a state in which the workpiece and the polishing tool are set in contact with each other is performed. Consequently, it is possible to provide a robot that can accurately keep a polishing force applied to the workpiece from the polishing tool fixed. For example, a polishing amount can be adjusted by changing the predetermined value set in advance. Therefore, when a character is drawn on the workpiece, it is possible to adjust shading of the character.

Another aspect of the invention is directed to a robot system including: a robot including a force sensor and an arm including a gripping section; and a control device. The control device brings a machining target gripped by the gripping section into contact with a fixed machining tool to machine the machining target.

With this configuration, in the robot, the force sensor is provided in the robot itself rather than on the machining tool side. Consequently, the control device keeps a contact state of the machining target and the machining tool according to an output value of the force sensor on which noise is not superimposed. Therefore, it is possible to provide the robot system that can accurately keep a force applied to the machining target fixed.

Still another aspect of the invention is directed to a control device that causes a robot including a force sensor and an arm including a gripping section to bring a machining target gripped by the gripping section into contact with a fixed machining tool to machine the machining target.

With this configuration, in the robot, the force sensor is provided in the robot itself rather than on the machining tool side. Consequently, the control device keeps a contact state of the machining target and the machining tool according to an output value of the force sensor on which noise is not superimposed. Therefore, it is possible to provide the control device that can accurately keep a force applied to the machining target fixed.

According to the aspects explained above, the force sensor is provided in the robot itself rather than on the machining tool side. Therefore, the robot keeps a contact state of the machining target and the machining tool according to an output value of the force sensor on which noise is not superimposed. Consequently, it is possible to provide the robot, the robot system, and the control device that can accurately keep a force applied to the machining target fixed.

BRIEF DESCRIPTION OF THE DRAWINGS

The invention will be described with reference to the accompanying drawings, wherein like numbers reference like elements.

DESCRIPTION OF EXEMPLARY EMBODIMENTS

A robot, a robot system, and a robot control device according to preferred embodiments of the invention are explained in detail below with reference to the drawings.

First Embodiment (Robot)

Figure 1:
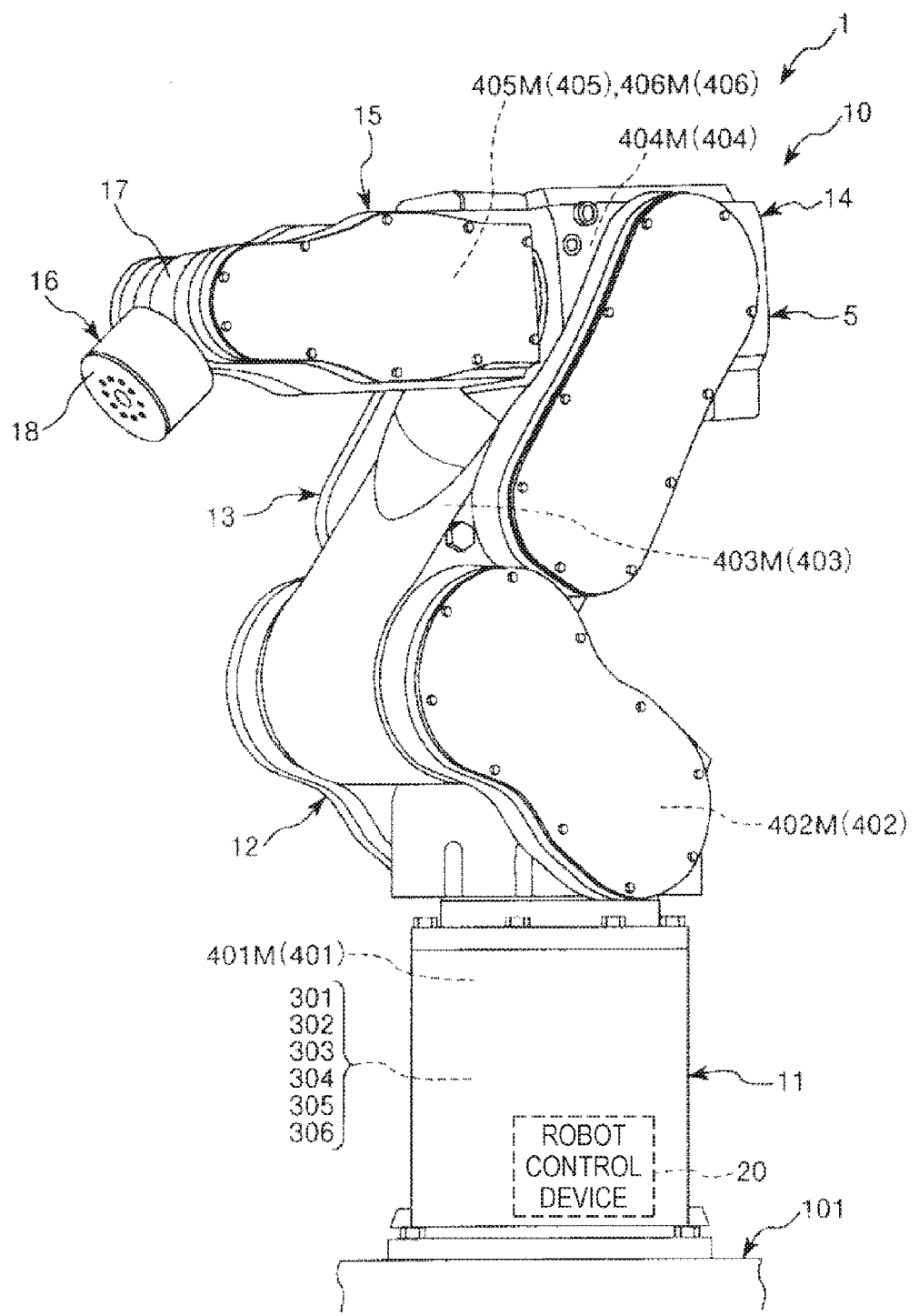
FIG. 1 is a perspective view showing a robot according to a first embodiment of the invention.
Figure 2:
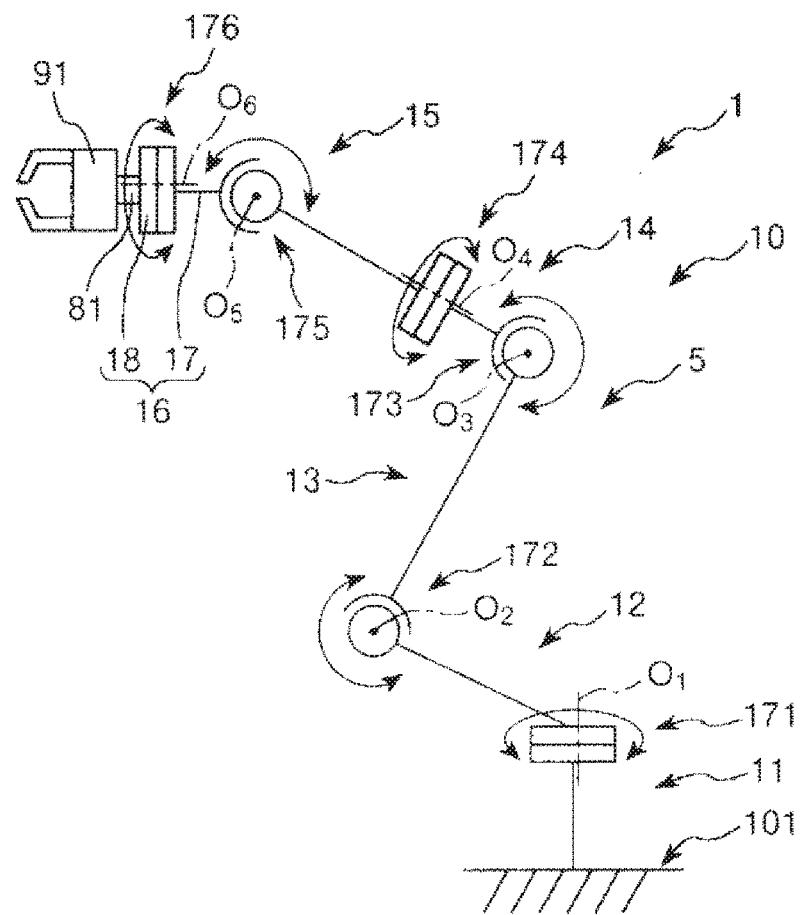
FIG. 2 is a schematic diagram of the robot shown in FIG. 1.
Figure 3:
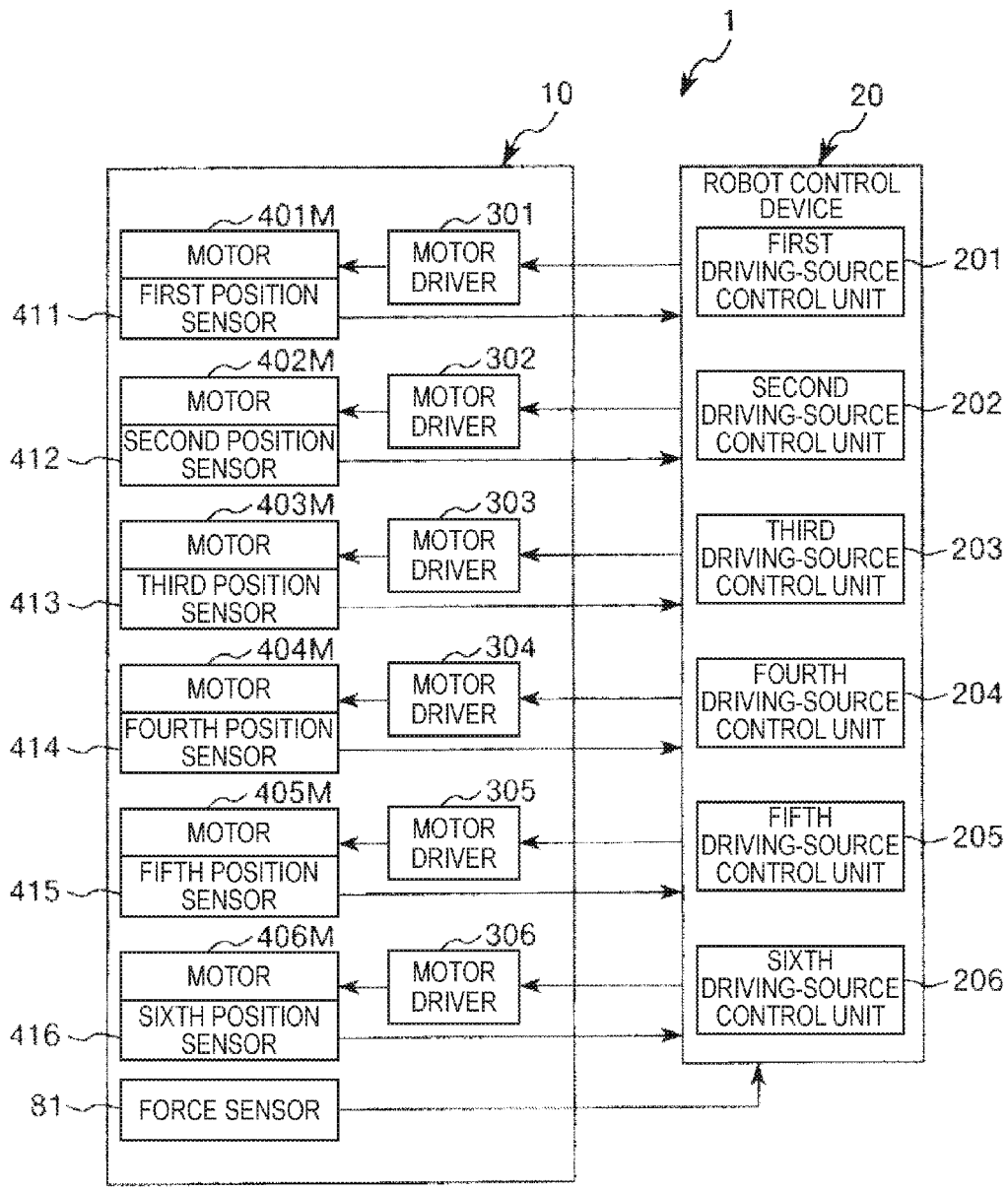
FIG. 3 is a block diagram of a main part of the robot shown in FIG. 1.
Figure 4:
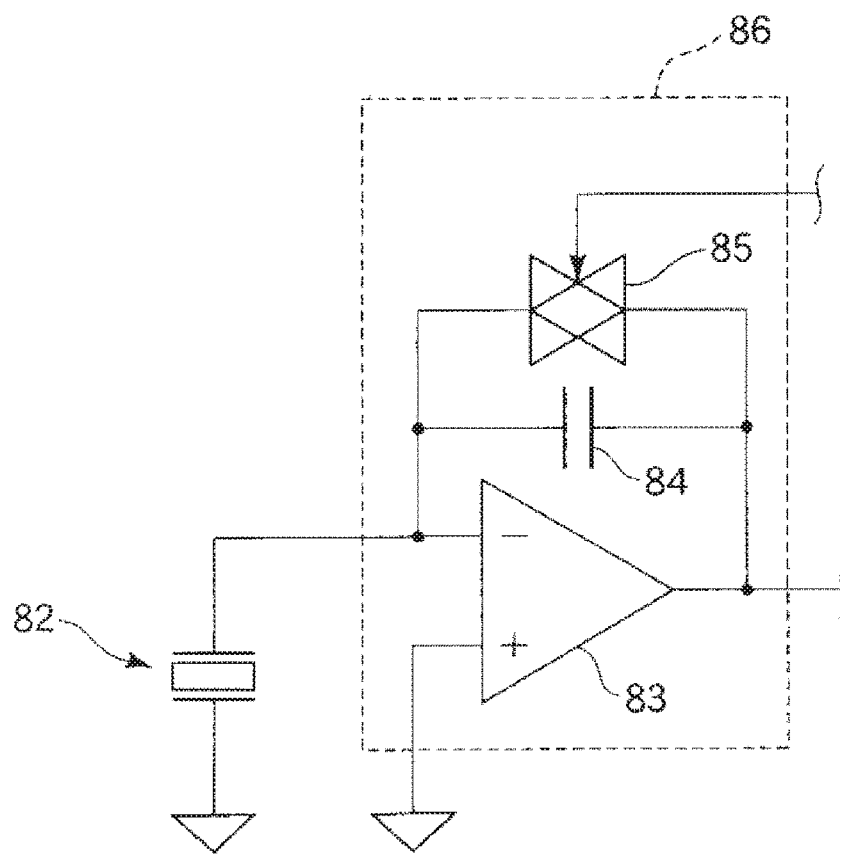
FIG. 4 is a circuit diagram showing the configuration of a part of a force sensor of the robot shown in FIG. 1.
Figure 5:
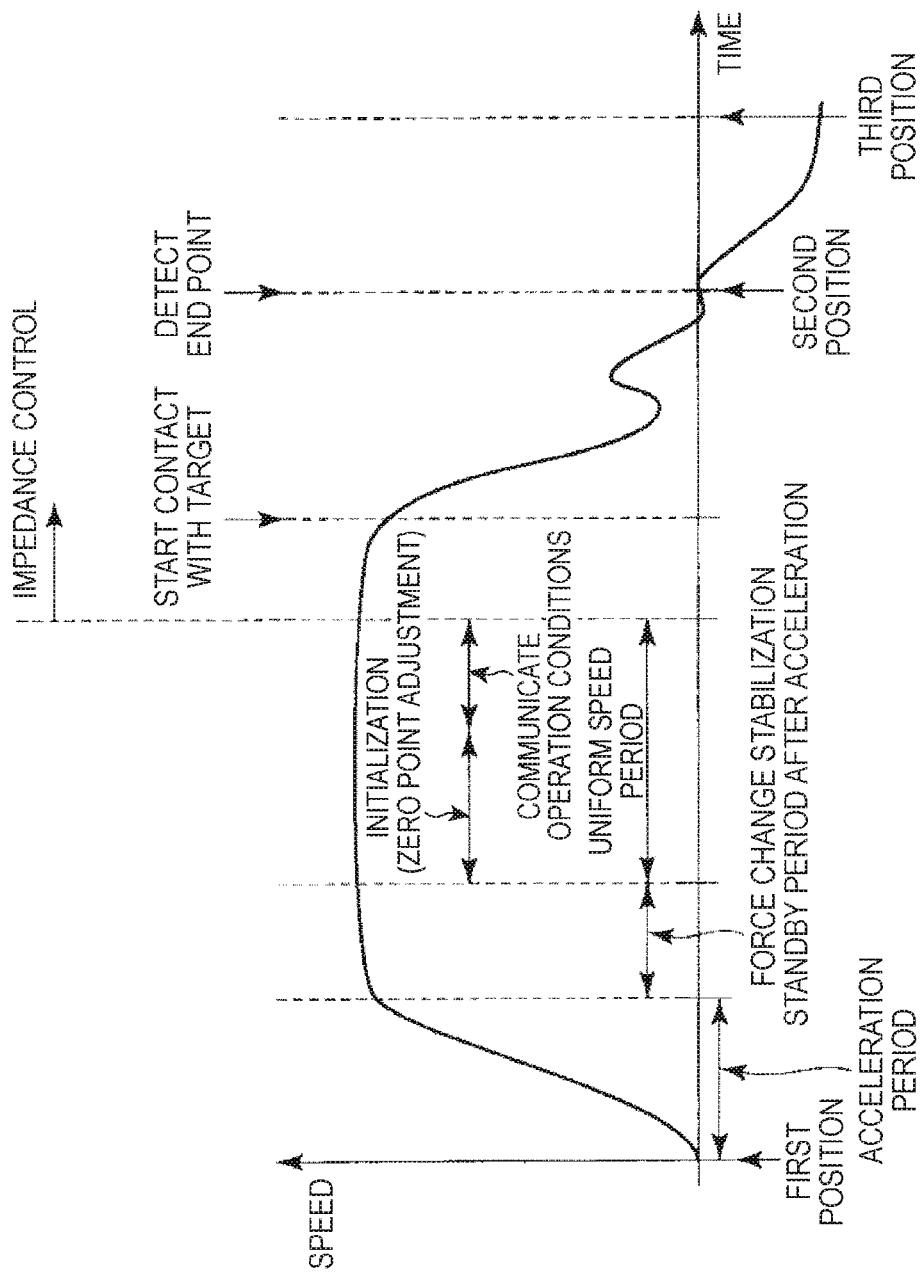
FIG. 5 is a timing chart showing the operation of the robot shown in FIG. 1 in a period including a period of initialization of a force sensor.
Figure 6:
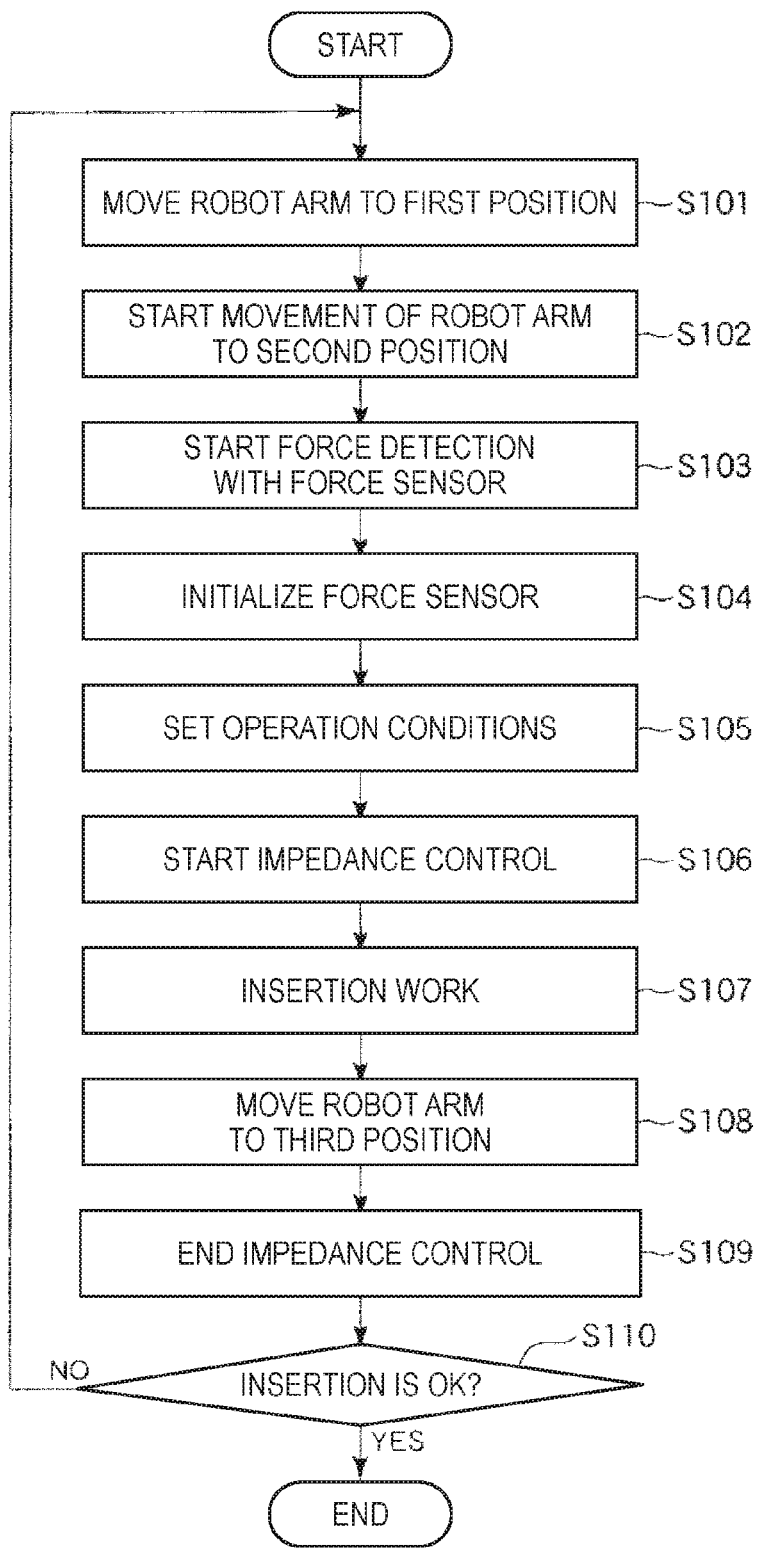
FIG. 6 is a flowchart for explaining a control operation of a robot control device of the robot shown in FIG. 1.

FIG. 1 is a perspective view of a robot according to a first embodiment of the invention viewed from the front side. FIG. 2 is a schematic diagram of the robot shown in FIG. 1. FIG. 3 is a block diagram of a main part of the robot shown in FIG. 1. FIG. 4 is a circuit diagram showing the configuration of a part of a force sensor of the robot shown in FIG. 1. FIG. 5 is a timing chart showing the operation of the robot shown in FIG. 1 in a period including a period of initialization of a force sensor. FIG. 6 is a flowchart for explaining a control operation of a robot control device of the robot shown in FIG. 1. FIGS. 7 to 10 are diagrams for explaining an operation in work of the robot shown in FIG. 1.

Note that, in the following explanation, for convenience of explanation, the upper side in FIGS. 1, 2, and 7 to 10 is referred to as "up" or "upward" and the lower side in the figures is referred to as "down" or "downward". The base side in FIGS. 1, 2, and 7 to 10 is referred to as "proximal end" and the opposite side of the base side is referred to as "distal end".

In FIGS. 7 to 10, to prevent the figures from being complicated, in a robot 1, only members necessary for explanation, that is, a second arm member 13, a third arm member 14, a wrist 16 (a fifth arm member 17), and a hand 91 are shown.

The robot (an industrial robot) 1 shown in FIGS. 1 to 3 can be used in a manufacturing process for manufacturing, for example, a precision instrument such as a wristwatch. The robot 1 includes a robot main body (a main body section) 10 and a robot control device (a control unit) 20 that controls the operation of the robot main body 10 (the robot 1). The robot control device 20 is incorporated in the robot 1. The robot main body 10 and the robot control device 20 are electrically connected. The position of the robot control device 20 in the robot 1 is not particularly limited. However, in the configuration shown in the figure, the robot control device 20 is set in a base 11. The robot control device 20 can be configured by, for example, a personal computer (PC) incorporating a CPU (Central Processing Unit). Note that the robot control device 20 is explained in detail below.

The robot main body 10 includes the base (a supporting section) 11 and a robot arm 5. The robot arm 5 includes six arm members (arm sections) 12, 13, 14, 15, 17, and 18 and six driving sources 401, 402, 403, 404, 405, and 406. A wrist 16 is configured by the arm member 17 and the arm member 18. An end effector (see FIG. 2) such as the hand 91 can be attached to the distal end of the arm member 18. That is, the robot 1 is a vertical multi-joint (six-axis) robot in which the base 11, the arm members 12, 13, 14, 15, 17, and 18, and the wrist 16 are coupled in this order from the proximal end side to the distal end side. Note that, in the following explanation, the arm member 12 is also referred to as "first arm member", the arm member 13 is also referred to as "second arm ember", the arm member 14 is also referred to as "third arm member", the arm member 15 is also referred to as "fourth arm member", the arm member 17 is also referred to as "fifth arm member", and the arm member 18 is also referred to as "sixth arm member". The driving source 401 is also referred to as "first driving source", the driving source 402 is also referred to as "second driving source", the driving source 403 is also referred to as "third driving source", the driving source 404 is also referred to as "fourth driving source", the driving source 405 is also referred to as "fifth driving source", and the driving source 406 is also referred to as "sixth driving source".

The arm members 12 to 15 and the wrist 16 are supported displaceably with respect to the base 11 independently from one another. The lengths of the arm members 12 to 15 and the wrist 16 are not particularly limited. However, in the configuration shown in the figure, the lengths of the first arm member 12, the second arm member 13, and the fourth arm member 15 are set larger than the lengths of the third arm member 14 and the wrist 16.

As shown in FIGS. 1 and 2, the base 11 and the first arm member 12 are coupled via a joint 171. The joint 171 includes a mechanism for supporting the first arm member 12 to be turnable with respect to the base 11 to which the first arm member 12 is coupled. Consequently, the first arm member 12 is configured to be turnable with respect to the base 11 about a first turning axis O1 parallel to the vertical direction. The first turning axis O1 coincides with the normal of the upper surface of a floor 101, which is a setting surface of the base 11. The turning about the first turning axis O1 is performed according to driving by the first driving source 401 including a motor 401M. The first driving source 401 is driven by the motor 401M and a cable (not shown in the figures). The motor 401M is controlled by the robot control device 20 via a motor driver 301 electrically connected to the motor 401M (see FIG. 3). Note that the first driving source 401 may be configured to transmit a driving force from the motor 401M with a reduction gear (not shown in the figures) provided together with the motor 401M. The reduction gear may be omitted.

The first arm member 12 and the second arm member 13 are coupled via a joint 172. The joint 172 includes a mechanism for supporting one of the first arm member 12 and the second arm member 13, which are coupled to each other, to be turnable with respect to the other. Consequently, the second arm member 13 is configured to be turnable with respect to the first arm member 12 about a second turning axis O2 parallel to the horizontal direction. The second turning axis O2 is orthogonal to the first turning axis O1. The turning about the second turning axis O2 is performed according to driving by the second driving source 402 including a motor 402M. The second driving source 402 is driven by the motor 402M and a cable (not shown in the figures). The motor 402M is controlled by the robot control device 20 via a motor driver 302 electrically connected to the motor 402M (see FIG. 3). Note that the second driving source 402 may be configured to transmit a driving force from the motor 402M with a reduction gear (not shown in the figures) provided together with the motor 402M. The reduction gear may be omitted. The second turning axis O2 may be parallel to an axis orthogonal to the first turning axis O1.

The second arm member 13 and the third arm member 14 are coupled via a joint 173. The joint 173 includes a mechanism for supporting one of the second arm member 13 and the third arm member 14, which are coupled to each other, to be turnable with respect to the other. Consequently, the third arm member 14 is configured to be turnable with respect to the second arm member 13 about a third turning axis O3 parallel to the horizontal direction. The third turning axis O3 is parallel to the second turning axis O2. The turning about the third turning axis O3 is performed according to driving by the third driving source 403. The third driving source 403 is driven by a motor 403M and a cable (not shown in the figures). The motor 403M is controlled by the robot control device 20 via a motor driver 303 electrically connected to the motor 403M (see FIG. 3). Note that the third driving source 403 may be configured to transmit a driving force from the motor 403M with a reduction gear (not shown in the figures) provided together with the motor 403M. The reduction gear may be omitted.

The third arm member 14 and the fourth arm member 15 are coupled via a joint 174. The joint 174 includes a mechanism for supporting one of the third arm member 14 and the fourth arm member 15, which are coupled to each other, to be turnable with respect to the other. Consequently, the fourth arm member 15 is configured to be turnable with respect to the third arm member 14 (the base 11) about a fourth turning axis O4 parallel to the center axis direction of the third arm member 14. The turning about the fourth turning axis O4 is performed according to driving by the fourth driving source 404. The fourth driving source 404 is driven by a motor 404M and a cable (not shown in the figures). The motor 404M is controlled by the robot control device 20 via a motor driver 304 electrically connected to the motor 404M (see FIG. 3). Note that the fourth driving source 404 may be configured to transmit a driving force from the motor 404M with a reduction gear (not shown in the figures) provided together with the motor 404M. The reduction gear may be omitted.

Further, the fourth arm member 15 and the fifth arm member 17 of the wrist 16 are coupled via a joint 175. The joint 175 includes a mechanism for supporting one of the fourth arm member 15 and the fifth arm member 17 of the wrist 16, which are coupled to each other, to be turnable with respect to the other. Consequently, the fifth arm member 17 of the wrist 16 is configured to be turnable with respect to the fourth arm member 15 about a fifth turning axis O5 parallel to the horizontal direction (a y-axis direction). The fifth turning axis O5 is orthogonal to the fourth turning axis O4. The turning about the fifth turning axis O5 is performed according to driving by the fifth driving source 405. The fifth driving source 405 is driven by the motor 405M and a cable (not shown in the figures). The motor 405M is controlled by the robot control device 20 via a motor driver 305 electrically connected to the motor 405M (see FIG. 3). Note that the fifth driving source 405 may be configured to transmit a driving force from the motor 405M with a reduction gear (not shown in the figures) provided together with the motor 405M. The reduction gear may be omitted.

The fifth arm member 17 of the wrist 16 and the sixth arm member 18 are coupled via a joint 176. The joint 176 includes a mechanism for supporting one of the fifth arm member 17 of the wrist 16 and the sixth arm member 18, which are coupled to each other, to be turnable with respect to the other. Consequently, the sixth arm member 18 of the wrist 16 is configured to be turnable with respect to the fifth arm member 17 about a sixth turning axis O6. The sixth turning axis O6 is orthogonal to the fifth turning axis O5. The turning about the sixth turning axis O6 is performed according to driving by the sixth driving source 406. The sixth driving source 406 is driven by a motor 406M and a cable (not shown in the figures). The motor 406M is controlled by the robot control device 20 via a motor driver 306 electrically connected to the motor 406M (see FIG. 3). Note that the sixth driving source 406 may be configured to transmit a driving force from the motor 406M with a reduction gear (not shown in the figures) provided together with the motor 406M. The reduction gear may be omitted. The fifth turning axis O5 may be parallel to an axis orthogonal to the fourth turning axis O4. The sixth turning axis O6 may be parallel to an axis orthogonal to the fifth turning axis O5.

As shown in FIG. 3, in the motors or the reduction gears of the respective driving sources 401 to 406, a first position sensor (a first angle sensor) 411, a second position sensor (a second angle sensor) 412, a third position sensor (a third angle sensor) 413, a fourth position sensor (a fourth angle sensor) 414, a fifth position sensor (a fifth angle sensor) 415, and a sixth position sensor (a sixth angle sensor) 416 are provided. The position sensors are not respectively particularly limited. For example, an encoder, a rotary encoder, a resolver, and a potentiometer can be used. The position sensors 411 to 416 respectively detect rotation angles of shaft sections of the motors or the reduction gears of the driving sources 401 to 406. The motors of the driving sources 401 to 406 are not respectively particularly limited. Examples of the motors include servo motors such as an AC servo motor and a DC servo motor and a piezoelectric motor including a piezoelectric element.

As shown in FIG. 2, the robot main body 10 includes a force sensor 81 provided at the distal end section of the arm member 18 of the wrist 16 of the robot arm 5 (between the arm member 18 of the wrist 16 and the hand 91).

The force sensor 81 detects a force such as reaction and a moment received via an insertion object 41 gripped by the hand 91. The force sensor 81 is not particularly limited. Various force sensors can be used. Examples of the force sensors include a six-axis force sensor that detects forces in the axial direction of three axes (an X axis, a Y axis, and a Z axis) orthogonal to one another and moments around the axes. Note that, in the following explanation, the force and the moment are collectively referred to as force as well. A detection result of the force sensor 81, that is, a signal output from the force sensor 81 is input to the robot control device 20.

An example of initialization of the force sensor 81 is explained. For the explanation, a circuit configuration of a part of the force sensor 81 is explained.

As shown in FIG. 4, the force sensor 81 includes a piezoelectric element 82 that outputs charges (a signal) according to a received external force and a conversion circuit 86 that converts the charges output from the piezoelectric element 82 into a voltage. The conversion circuit 86 includes an operational amplifier 83, a capacitor 84, and a switching element 85. An inverted input terminal (a minus input) of the operational amplifier 83 is connected to the piezoelectric element 82. A non-inverted input terminal (a plus input) of the operational amplifier 83 is earthed to the ground (a reference potential point). An output terminal of the operational amplifier 83 is connected to a circuit at a later stage. The capacitor 84 is connected between an inverted input terminal and the output terminal of the operational amplifier 83. The switching element 85 is connected between the inverted input terminal and the output terminal of the operational amplifier 83 and connected in parallel to the capacitor 84. The switching element 85 is connected to a driving circuit (not shown in the figure). The switching element 85 executes a switching operation according to ON and OFF signals received from a driving circuit (not shown in the figure).

When the switching element 85 is off, the charges output from the piezoelectric element 82 are accumulated in the capacitor 84 and output to a circuit at a later stage as a voltage. Consequently, force detection can be performed. Subsequently, when the switching element 85 is turned on, both terminals of the capacitor 84 are short-circuited. As a result, the charges accumulated in the capacitor 84 are discharged and decrease to 0 coulomb. The voltage output to the circuit at the later stage decreases to 0 volt. Turning on the switching element 85 is referred to as resetting the conversion circuit 86. In this example, this is initialization (zero-point correction) of the force sensor 81. Note that a voltage output from an ideal conversion circuit 86 is proportional to an amount of charges output from the piezoelectric element 82. The switching element 85 is not particularly limited. For example, a semiconductor switching element such as a MOSFET (Metal Oxide Semiconductor Field Effect Transistor) can be used. Note that the switching element 85 is not limited to the semiconductor switching element. For example, a mechanical switch may be used. It goes without saying that the configuration of the force sensor 81 is not limited to the configuration explained above.

As shown in FIG. 3, the robot main body 10 is electrically connected to the robot control device 20. That is, the driving sources 401 to 406, the position sensors 411 to 416, and the force sensor 81 are electrically connected to the robot control device 20.

The robot control device 20 can cause the arm members 12 to 15 and the wrist 16 to operate independently from one another. That is, the robot control device 20 can control the driving sources 401 to 406 independently from one another via the motor drivers 301 to 306. In this case, the robot control device 20 performs detection with the position sensors 411 to 416 and the force sensor 81 and controls the driving of the driving sources 401 to 406, for example, angular velocities, rotation angles, and the like respectively on the basis of detection results of the sensors. In this case, the robot control device 20 performs predetermined control such as impedance control (force control) and position control. A control program for the control is stored in advance in a recording medium incorporated in the robot control device 20.

Note that, as shown in FIG. 1, when the robot 1 is a vertical multi-joint robot, the base 11 is a portion located in the lowermost part of the vertical multi-joint robot and fixed to the floor 101 of a setting space. In the base 11, for example, the motor 401M and the motor drivers 301 to 306 are housed.

In the wrist 16, as an end effector, the hand 91 that grips a precision instrument such as a wristwatch is detachably attached to the distal end section (an end on the opposite side of the fourth arm member 15) of the wrist 16 (see FIG. 2). Note that the hand 91 is not particularly limited. Examples of the hand 91 include a hand including a plurality of finger sections (fingers). The robot 1 can convey the precision instrument by controlling the operations of the arm members 12 to 15, the wrist 16, and the like while gripping the precision instrument with the hand 91.

The configuration of the robot control device 20 is explained with reference to FIGS. 1 to 3.

The robot control device 20 includes a first driving-source control unit 201 that controls the operation of the first driving source 401, a second driving-source control unit 202 that controls the operation of the second driving source 402, a third driving-source control unit 203 that controls the operation of the third driving source 403, a fourth driving-source control unit 204 that controls the operation of the fourth driving source 404, a fifth driving-source control unit 205 that controls the operation of the fifth driving source 405, and a sixth driving-source control unit 206 that controls the operation of the sixth driving source 406.

The robot control device 20 calculates, on the basis of contents of processing performed by the robot 1, a target position of the distal end section of the wrist 16, that is, a target position of the hand 91 attached to the wrist 16 and generates a track for moving the hand 91 to the target position. The robot control device 20 measures rotation angle of the driving sources 401 to 406 at each predetermined cycle and outputs values calculated on the basis of results of the measurement respectively to the driving-source control units 201 to 206 as position commands for the driving sources 401 to 406 such that the hand 91 (the wrist 16) moves along the generated track. The robot control device 20 performs detection with the position sensors 411 to 416 and the force sensor 81 and controls driving of the driving sources 401 to 406 respectively on the basis of results of the detection.

In performing work using the force sensor 81, the robot 1 performs initialization (zero-point correction) of the force sensor 81 according to the control by the robot control device 20. The robot 1 performs the initialization while the robot arm 5 is moving at uniform speed. Unless the robot arm 5 is not stopped, acceleration is not applied if the robot arm 5 is moved at the uniform speed. Therefore, it is possible to properly initialize the force sensor 81. The robot 1 initializes the force sensor 81 while the robot arm 5 is moving. Therefore, it is possible to reduce a cycle time in the work performed using the force sensor 81. Note that the robot control device 20 grasps on the basis of an operation instruction (a command, etc.) of the robot 1 whether the robot arm 5 is moving at the uniform speed. In the following explanation, the initialization of the force sensor 81 is also simply referred to as "initialization".

The initialization of the force sensor 81 means setting an output value (a force detection value) of the force sensor 81 to a predetermined value (a reference value). In other words, the initialization of the force sensor 81 means eliminating or reducing, for example, the influence of the gravity due to fluctuation in the weight of a workpiece, the posture of the robot arm 5, and the like and the influence of drift due to a leak current, thermal expansion, and the like of a circuit. That is, the initialization of the force sensor 81 means setting a value output from the force sensor 81 because of, for example, the influence of the gravity due to fluctuation in the weight of a workpiece, the posture of the robot arm 5, and the like and the influence of a drift due to a leak current, thermal expansion, and the like of a circuit to a predetermined value. As the predetermined value, "0" is preferable.

As a specific example, for example, as explained above, the initialization of the force sensor means turning on (closing) the switching element 85 of the force sensor 81 and discharging charges accumulated in the capacitor 84 (see FIG. 4).

As another specific example, the initialization of the force sensor 81 means reading an output value of the force sensor 81 in order to treat an output value of the initialized force sensor 81 as a predetermined value. For example, when the output value of the initialized force sensor 81 is treated as "0", the read output value of the force sensor 81 is "a". When an output value of the force sensor 81 in force detection after that is "b", an actual force detection value is "b−a". Note that a signal processing circuit that performs the arithmetic operation (the signal processing) explained above may be provided separately from the force sensor 81 or may be included in the force sensor 81.

The uniform speed not only means that speed does not change at all but also means that an absolute value of a difference between a maximum and a minimum of the speed is equal to or smaller than 2 mm/sec.

When it is determined whether the robot arm 5 is moving at the uniform speed, speed of which part of the robot arm 5 is set as a target of the determination is not particularly limited and is set as appropriate according to conditions. However, the part is preferably a part where the force sensor 81 of the robot arm 5 is provided. That is, it is preferable to determine on the basis of speed of the part where the force sensor 81 of the robot arm 5 is provided whether the robot arm 5 is moving at the uniform speed. Note that, in this embodiment, the force sensor 81 is set between the sixth arm member 18 of the wrist 16 and the hand 91. Therefore, speed of the distal end section of the robot arm 5, that is, the distal end section of the sixth arm member 18 of the wrist 16 is the target of the determination. That is, it is determined on the basis of the speed of the distal end section of the robot arm 5 whether the robot arm 5 is moving at the uniform speed. Consequently, in the initialization, it is possible to suppress acceleration from being applied to the force sensor 81 because of movement (displacement) of the robot arm 5. It is possible to properly initialize the force sensor 81.

As explained above, the initialization only has to be performed while the robot arm 5 is moving at the uniform speed. However, it is preferable that the initialization is performed while the robot arm 5 is moving at the uniform speed and when the amplitude of a detection value of the force sensor 81 is smaller than a predetermined threshold T. When it is determined on the basis of an operation instruction of the robot 1 that the robot arm 5 is moving at the uniform speed, actually, the robot arm 5 may not be moving at the uniform speed. Therefore, it is possible to surely determine that the robot arm 5 is moving at the uniform speed.

Timing of the initialization is not particularly limited if the robot arm 5 is moving at the uniform speed. However, it is preferable that the timing is a point in time while the robot arm 5 is moving at the uniform speed and when the amplitude of the detection value of the force sensor 81 is smaller than the threshold T. That is, it is preferable to initialize the force sensor 81 while the robot arm 5 is moving at the uniform speed and when the amplitude of the detection value of the force sensor 81 is smaller than the threshold T. Consequently, it is possible to properly initialize the force sensor 81. It is possible to further reduce the cycle time.

The threshold T is preferably equal to or smaller than 10 N and more preferably equal to or smaller than 1 N.

By setting the threshold T to the value, in the initialization, it is possible to suppress acceleration from being applied to the force sensor 81 because of the movement (displacement) of the robot arm 5. It is possible to properly initialize the force sensor 81.

It is preferable to fix the postures of the wrist 16 and the hand 91 until the initialization ends. By fixing the postures of the wrist 16 and the hand 91, it is possible to more surely move the wrist 16 and the hand 91 at uniform speed. Consequently, it is possible to properly initialize the force sensor 81.

A specific example of the work performed using the force sensor 81 of the robot 1 and the initialization of the force sensor 81 are explained in detail below with reference to FIGS. 5 to 10. In the following explanation, a control operation of the robot control device 20 is also explained.

The work performed using the force sensor 81 is not particularly limited. However, in this embodiment, an example is explained in which, as shown in FIGS. 7 to 10, the insertion object 41, which is a first member (a first assembly target), including a protrusion (an insertion section) 42 is gripped by the hand 91 and the insertion object 41 (the protrusion 42) is inserted into a hole (an opening) 47 of an insertion target 46, which is a second member (a second assembly target), according to impedance control. In this work, the insertion target 46 is arranged in a second position. The robot arm 5 is moved from a first position to the second position according to the control by the robot control device 20. The insertion object 41 is inserted into the hole 47 of the insertion target 46. Thereafter, the robot arm 5 is moved to a third position. Note that in the above explanation and the following explanation, "move the robot arm 5 to the first position, the second position, and the third position" means moving the wrist 16 and the hand 91 to the first position, the second position, and the third position.

Figure 7:
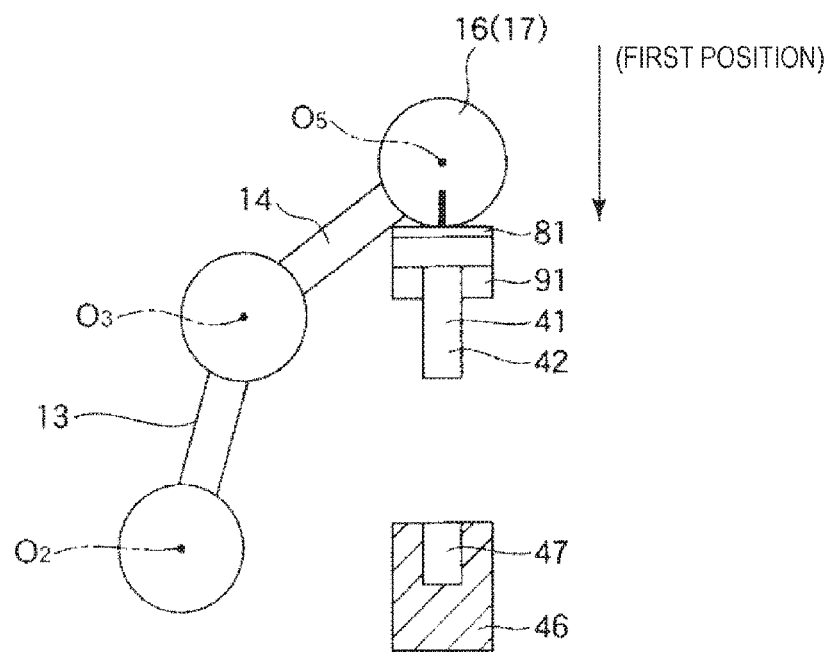
FIG. 7 is a diagram for explaining an operation in a workpiece of the robot shown in FIG. 1.

In this work, first, as shown in FIGS. 6 and 7, the robot control device 20 moves the robot arm 5 to the first position (step S101).

Figure 8:
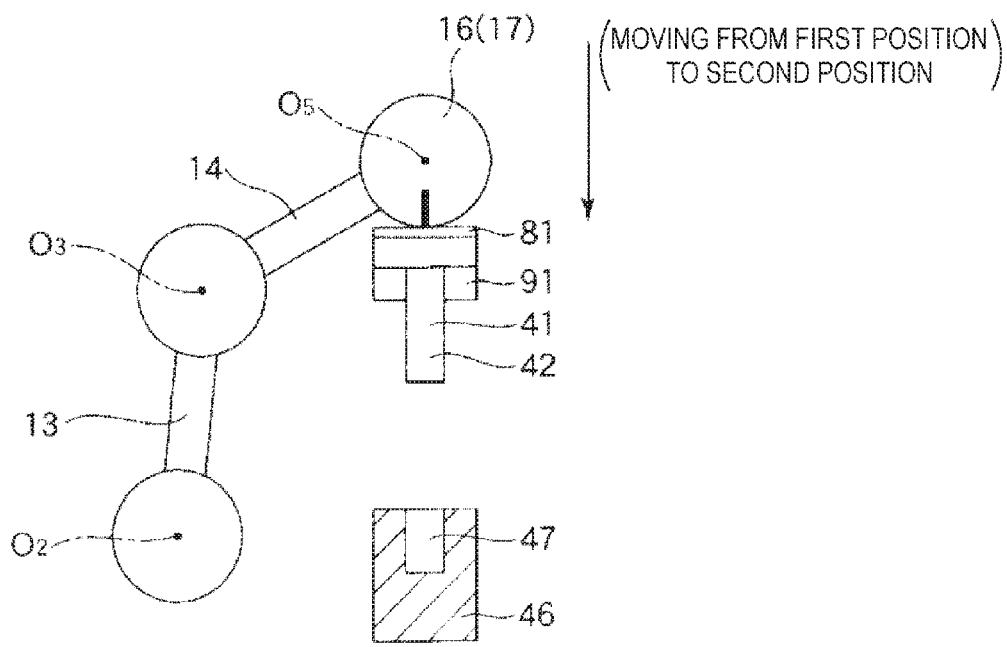
FIG. 8 is a diagram for explaining the operation in the workpiece of the robot shown in FIG. 1.
Figure 9:
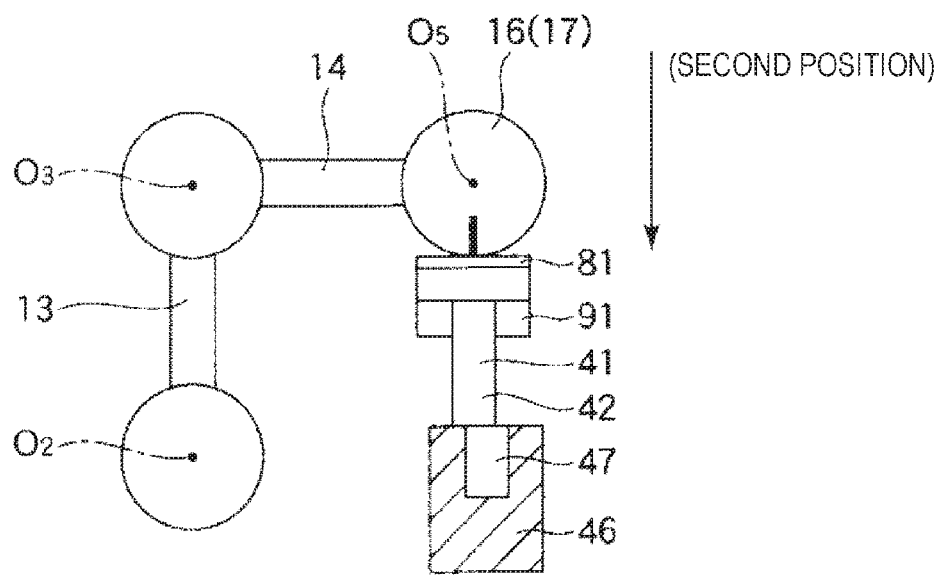
FIG. 9 is a diagram for explaining the operation in the workpiece of the robot shown in FIG. 1.

Subsequently, as shown in FIGS. 8 and 9, the robot control device 20 starts movement of the robot arm 5 to the second position (step S102). The robot control device 20 starts force detection with the force sensor 81 (step S103). As explained above, a result of the force detection by the force sensor 81 is used to determine whether the amplitude of a detection value of the detection is smaller than the threshold T.

As shown in FIG. 5, when the robot arm 5 moves from the first position to the second position, first, speed of the robot arm 5 changes to a uniform speed period through an acceleration period in which the speed increases and a period until the speed stabilizes (a stabilization standby period). The robot control device 20 grasps the uniform speed period on the basis of an operation instruction of the robot 1 as well. As explained above, in the equal speed period, when the amplitude of the detection value of the force sensor 81 is smaller than the predetermined threshold T, the robot control device 20 performs the initialization of the force sensor 81 (step S104). In the equal speed period, the robot control device 20 communicates and sets operation conditions (parameters) (step S105). The robot control device 20 fixes the postures of the wrist 16 and the hand 19 until the initialization ends. Note that, in the configuration shown in the figure, the postures of the wrist 16 and the hand 91 are fixed until the insertion object 41 is inserted into the hole 47 of the insertion target 46.

Subsequently, before the insertion object 41 comes into contact with the insertion target 46, the robot control device 20 starts impedance control (step S106). According to the impedance control, it is possible to cause the insertion object 41 to trace the insertion target 46. It is possible to prevent an excessive force from being applied to the insertion object 41 at an instance when the insertion object 41 comes into contact with the insertion target 46 and in a contact state in which the insertion object 41 is in contact with the insertion target 46. The robot control device 20 moves the robot arm 5 to the second position and inserts the insertion object 41 into the hole 47 of the insertion target 46 (step S107) (see FIG. 10).

Figure 10:
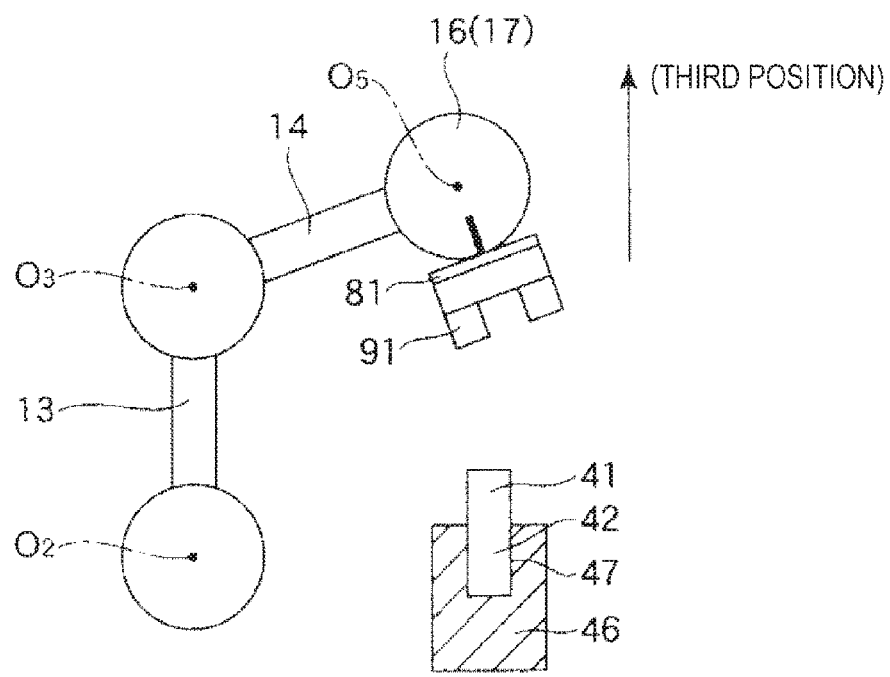
FIG. 10 is a diagram for explaining a robot according to the workpiece of the robot shown in FIG. 1.

Subsequently, as shown in FIG. 10, the robot control device 20 moves the robot arm 5 to the third position (step S108). The robot control device 20 ends the impedance control (step S109).

Subsequently, the robot control device 20 determines whether the insertion object 41 is inserted into the hole 47 of the insertion target 46 (step S110). When determining that the insertion object 41 is not inserted into the hole 47, the robot control device 20 returns to step S101 and executes step S101 and subsequent steps again. When determining that the insertion object 41 is inserted into the hole 47, the robot control device 20 ends the work.

Note that, when the amplitude of the detection value of the force sensor 81 is not smaller than the threshold T in the uniform speed period and the insertion object 41 is more likely to come into contact with the insertion target 46, for example, the robot control device 20 may once stop the robot arm 5 and perform the initialization.

As explained above, the robot 1 performs the initialization of the force sensor 81 without stopping the robot arm 5. Therefore, it is possible to reduce the cycle time in the work performed using the force sensor 81. Consequently, it is possible to improve work efficiency.

Second Embodiment (A Robot)

Figure 11:
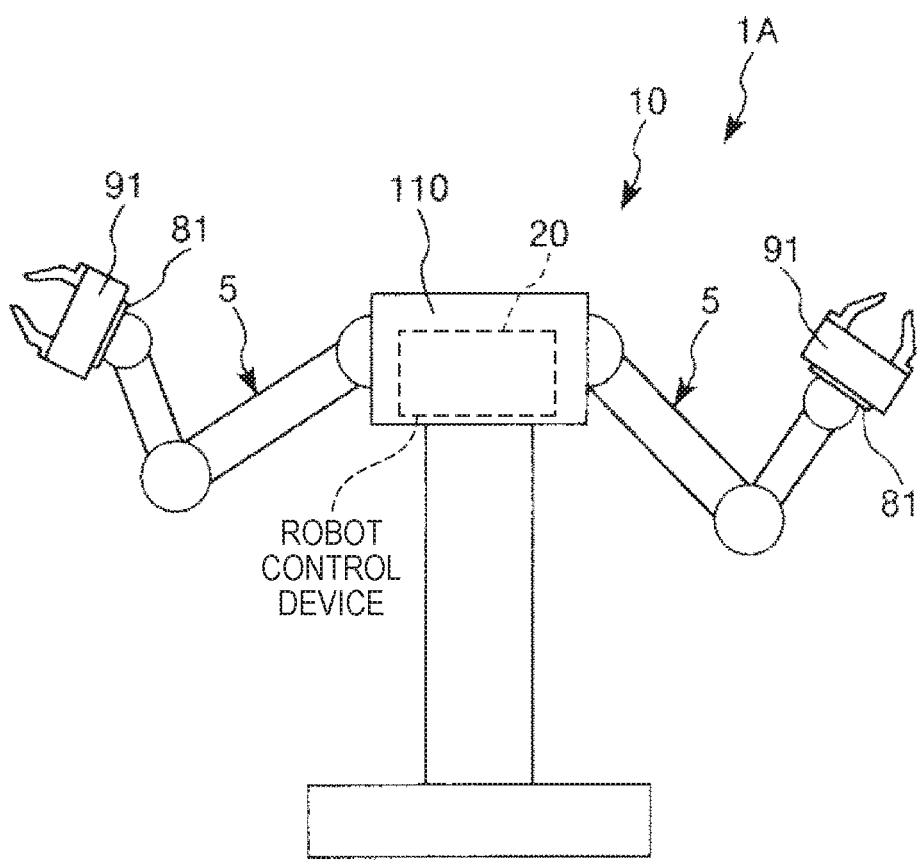
FIG. 11 is a schematic diagram showing a robot according to a second embodiment of the invention.

FIG. 11 is a schematic diagram showing a robot according to a second embodiment of the invention.

Differences of the second embodiment from the first embodiment are mainly explained below. Explanation of similarities is omitted.

As shown in FIG. 11, a robot 1A in the second embodiment is a double-arm robot. The robot main body 10 of the robot 1A includes two robot arms 5 and a body section 110 functioning as a base (a supporting section) that supports the robot arms 5. For example, the robot 1A can perform work by gripping the insertion object 41 with one of two hands 91 and gripping the insertion target 46 with the other.

With the robot 1A, effects same as the effects in the first embodiment can be obtained.

Since the robot 1A is a double-arm robot, the robot 1A can perform various operations and can perform various kinds of work.

Note that the number of robot arms is not limited to two and may be three or more.

Third Embodiment (A Robot System)

Figure 12:
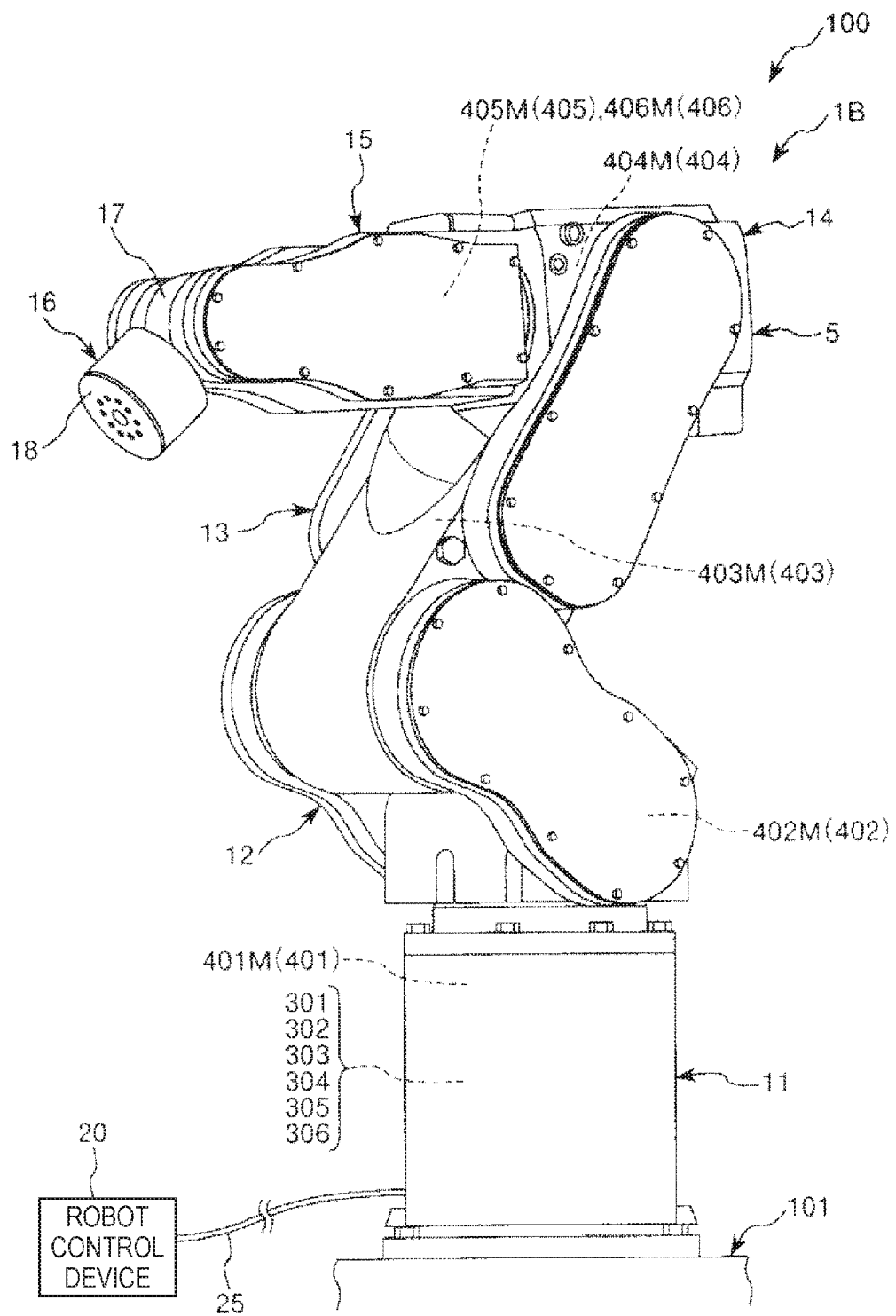
FIG. 12 is a perspective view showing a robot system according to a third embodiment of the invention.

FIG. 12 is a perspective view showing a robot system according to a third embodiment of the invention.

Differences of the third embodiment from the first embodiment are mainly explained below. Explanation of similarities is omitted.

As shown in FIG. 12, a robot system 100 includes a robot 1B and a robot control device (a control unit) 20, which is separate from the robot 1B. In the robot 1B, the robot control device 20 is excluded from the robot 1 in the first embodiment. The robot 1B and the robot control device 20 are electrically connected by a cable 25.

Note that the robot 1B and the robot control device 20 may be configured to perform communication by radio.

With the robot system 100, effects same as the effects in the first embodiment can be obtained. Note that this embodiment can be applied to the second embodiment as well.

The robot, the robot system, and the robot control device according to the embodiments of the invention are explained above. However, the invention is not limited to this. The components of the sections can be replaced with any components having the same functions. Any other components may be added to the invention.

The invention may be an invention obtained by combining any two or more components (features) of the embodiments.

In the embodiments, the impedance control is explained as the example of the control performed using the force sensor. However, in the invention, the control is not limited to the impedance control. Other examples of the control include compliance control.

In the first and third embodiments, the number of the turning axes of the robot arms is six. However, in the invention, the number of the turning axes is not limited to six and may be, for example, two, three, four, five, or seven or more. That is, in the first and third embodiments, since the wrist includes two arm members, the number of the arm members of the robot arm is six. However, in the invention, the number of the arm members is not limited to six and may be, for example, two, three, four, five, or seven or more.

In the invention, the robot (the robot main body) may be robots of other forms. Specific examples of the robots include a leg walking (running) robot including leg sections, a scalar robot, a handler, and an apparatus exclusive for production.

Fourth Embodiment (A Robot System)

Figure 13:
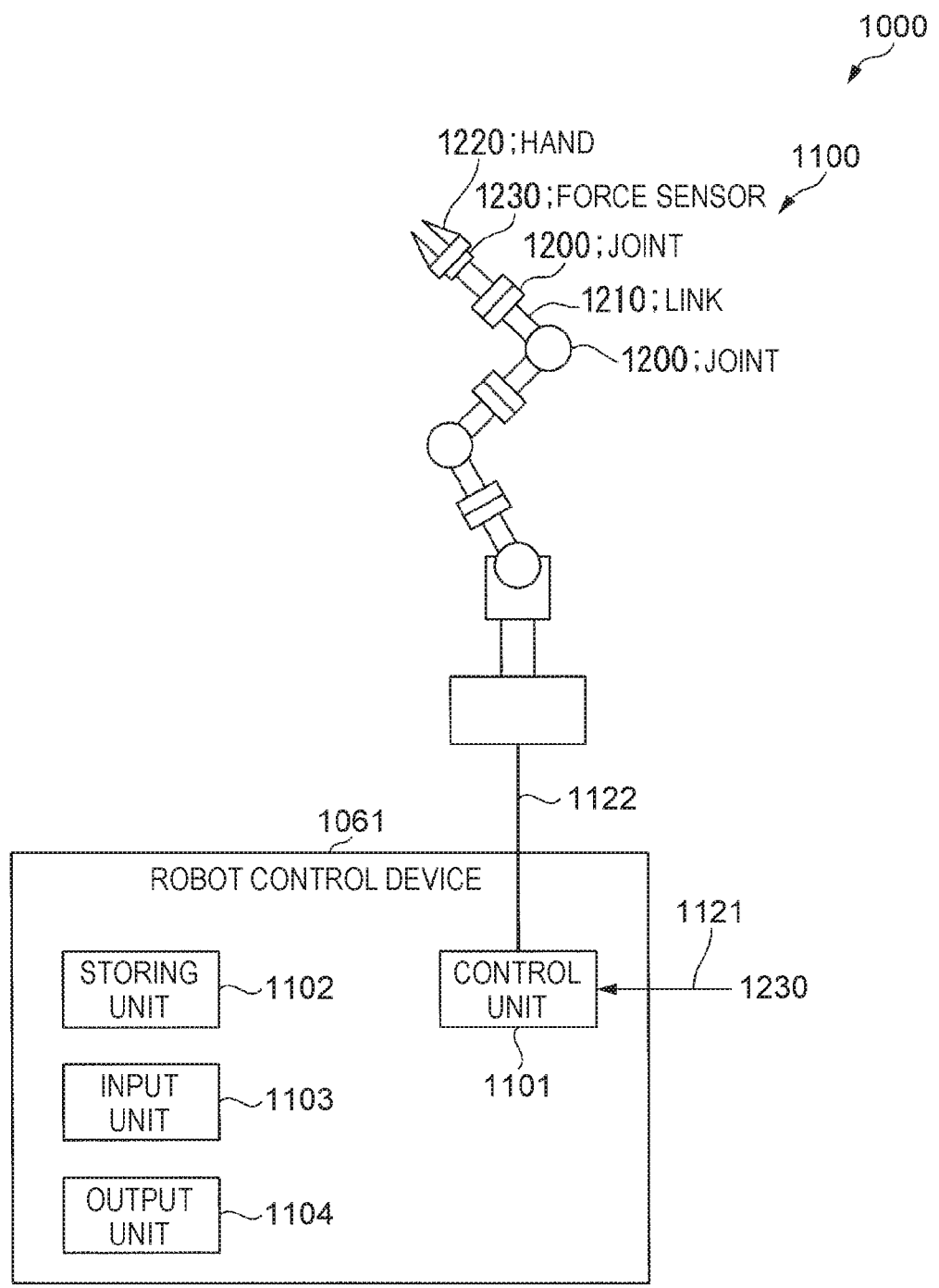
FIG. 13 is a diagram showing a schematic configuration example of a robot system according to a fourth embodiment of the invention.

A robot system according to a fourth embodiment of the invention is explained in detail with reference to the drawings. FIG. 13 is a diagram showing a schematic configuration example of the robot system according to the embodiment of the invention. A robot system 1000 includes a robot 1100, a robot control device 1061, a communication line 1121, and a communication line 1122.

The robot 1100 is controlled by the robot control device 1061. The robot 1100 is, for example, as shown in FIG. 13, a robot of an arm type that performs, for example, gripping of a workpiece. An arm of the robot 1100 includes, for example, a plurality of joints 1200, a plurality of links 1210, a hand 1220 (a gripping section), and a force sensor 1230.

The joints 1200 couples the links 1210, couples a body section and the link 1210, couples the hand 1220 and the link 1210 to be turnable (turnable within a predetermined range). In the example shown in the figure, the robot 1100 is a six-axis arm including six joints.

The joints 1200 and the hand 1220 include, for example, an actuator (not shown in FIG. 13) for causing the joints 1200 and the hand 1220 to operate. The actuator includes, for example, a servo motor and an encoder. An encoder value (a coordinate indicating the present position) output by the encoder is used for feedback control of the robot 1100 by the robot control device 1061.

The robot 1100 includes a force sensor 1230 in the hand 1220. For example, when a machining target gripped by the hand 1220 comes into contact another object (a machining tool) or the like, the force sensor 1230 measures an external force (an acting force) applied from the machining tool and outputs the external force to the robot control device 1061 via the communication line 1121. A sensor value (an output value) output by the force sensor 1230 is used for impedance control of the robot 1100 by the robot control device 1061 (explained in detail below).

Note that the six-axis arm is shown in FIG. 13. However, the number of axes (the number of joints) may be further increased or reduced. The number of links may be increased or reduced. The shapes, the sizes, the arrangement, the structures, and the like of the various members such as the arm, the hand, the links, and the joints may be changed as appropriate. The position and the like of the force sensor 1230 may be also changed as appropriate.

The robot control device 1061 is a device that controls the operation of the robot 1100. The robot control device 1061 includes a control unit 1101, a storing unit 1102, an input unit 1103, and an output unit 1104.

The control unit 1101 is configured using, for example, a CPU (Central Processing Unit) and performs various kinds of arithmetic processing. The various kinds of arithmetic processing performed by the control unit 1101 are processing explained below and the like.

Figure 14:
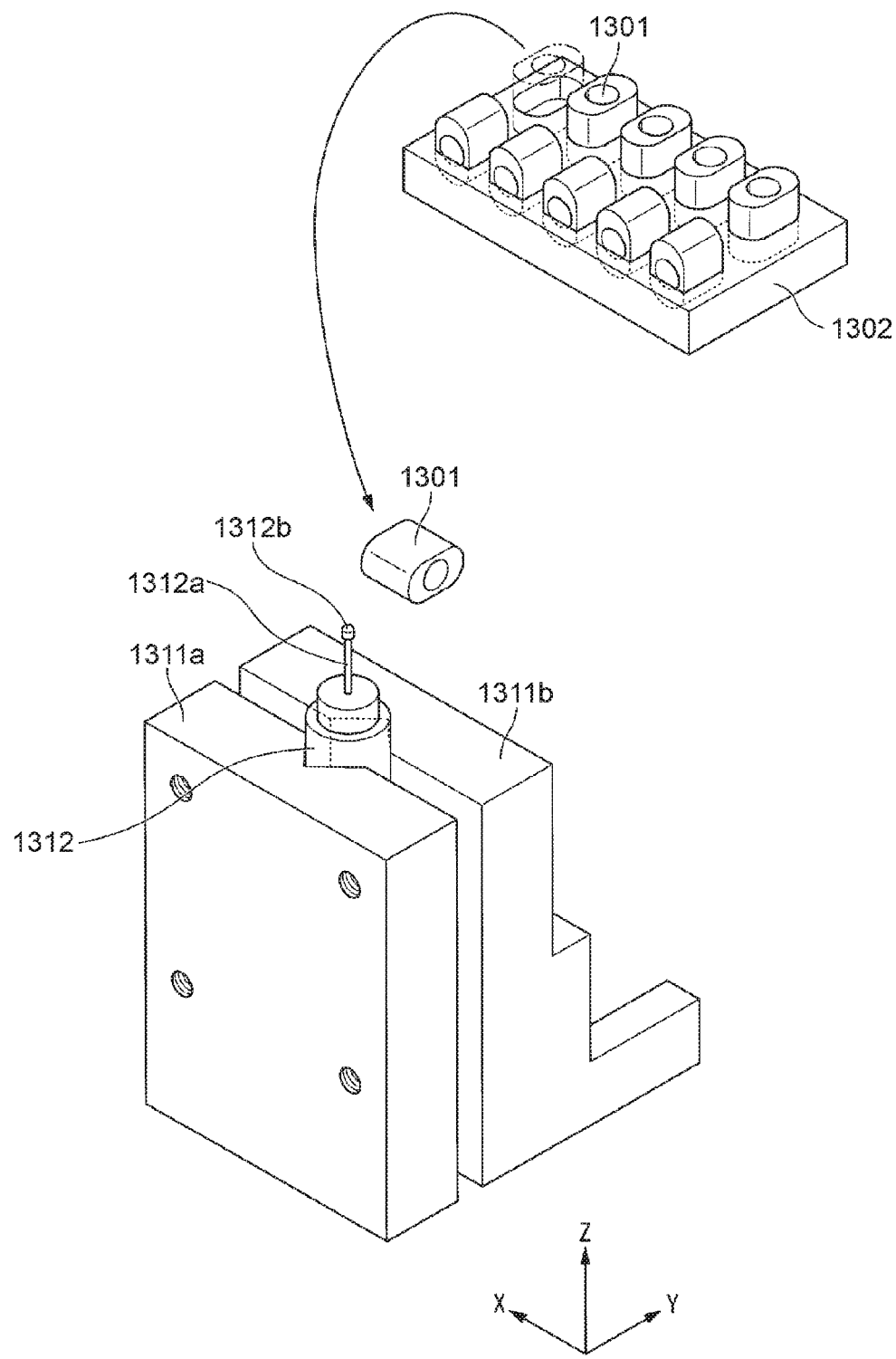
FIG. 14 is a diagram for explaining a specific example of the robot system shown in FIG. 13.

One kind of processing among the kinds of arithmetic processing performed by the control unit 1101 is position control for performing movement of the hand 1220. Note that, as shown in FIG. 14, positions (X, Y, and Z) of the members of the robot 1100 including the hand 1220 are decided according to the X axis, the Y axis, and the Z axis with a predetermined position (e.g., the center of a workpiece placing table 1302 shown in FIG. 14) set as the origin. Note that, in the position control, postures ($\theta x$, $\theta y$, and $\theta z$), which are values indicating the postures of the members, may be further used.

Note that, concerning the position control, the positions of the members in a three-dimensional space are set using the positions (X, Y, and Z) and the motions of the members in the three-dimensional space are controlled. However, for example, the position control and posture control may be performed on the basis of the configuration of a visual servo. That is, by stationarily or movably setting a camera that photographs a machining target gripped by the hand 1220 of the robot 1100 and comparing a photographed image of the camera and a reference image prepared in advance, the position control and the posture control for the robot may be performed on the basis of a result of the comparison.

Another kind of processing of the kinds of arithmetic processing performed by the control unit 1101 is impedance control. The impedance control means performing the position control to equalize a sensor value of the force sensor 1230 with a setting value (a predetermined value) set in advance. That is, if a machining target is brought into contact with a machining tool with a predetermined pressing force, the force sensor 1230 outputs a sensor value same as the pressing force to the control unit 1101. Therefore, when the sensor value is equal to or larger than the predetermined value, position control for moving the machining target away from the machining tool is performed. On the other hand, when the sensor value is smaller than the predetermined value, position control for bringing the machining target close to the machining tool is performed. According to such impedance control, it is possible to press the machining target against the machining tool with the predetermined pressing force. Note that, when an external force is not detected by the force sensor 1230, the impedance control is not performed.

The control unit 1101 performs the position control and the impedance control and outputs a control signal for causing the robot 1100 to operate to the robot 1100 via the communication line 1122. The robot 1100 grips the machining target with the hand 1220 and moves the machining target to a predetermined position according to a control signal input from the control unit 1101. The robot 1100 can press the machining target against the machining tool with the predetermined pressing force.

The storing unit 1102 includes a storage medium that stores various kinds of information. The storing unit 1102 stores, for example, information concerning a computer program used by the control unit 1101 and information concerning parameters (e.g., target values such as coordinates of the members) used in various kinds of processing.

The input unit 1103 receives an input from the outside. The input unit 1103 includes a keyboard, a mouse, and the like that receive an operation input of operation by a user. The input unit 1103 may include, for example, a function for receiving an input from an external apparatus.

The output unit 1104 performs an output to the outside. The output unit 1104 includes, for example, a screen (e.g., a liquid crystal display) that displays various kinds of information to the user as images and a speaker that outputs information concerning sound to the user. The output unit 1104 may include a function for outputting information to the external apparatus.

A specific example is explained in which the robot system 1000 including the configuration explained above is applied to a polishing apparatus that polishes (machines) the surface of a workpiece (a machining target). FIG. 14 is a diagram for explaining a specific example of the robot system shown in FIG. 13. In FIG. 14, a workpiece 1301 is a machining target that the hand 1220 of the robot 1100 grips. The workpiece 1301 is, for example, a SUS304 center-less polished round bar $\phi$50 mm. In FIG. 14, nine workpieces 1301 are placed on the workpiece placing table 1302.

The workpiece placing table 1302 is configured by, for example, MC Nylon (registered trademark). In the workpiece placing table 1302, clearance between workpieces is set to make it possible to mount ten workpieces. When a control signal, which is an arithmetic result by the position control, is input from the robot control device 1061, the robot 1100 shown in FIG. 13 grips, with the hand 1220, one workpiece 1301 placed on the workpiece placing table 1302 and brings the workpiece 1301 close to a position (an initial position) away from a rotating tool 1312 by a predetermined distance such that the workpiece 1301 is polished by a Leutor (the rotating tool 1312; a machining tool).

The rotating tool 1312 includes a rotating shaft 1312$a$ rotated by an electric motor. For example, a grindstone is attached to the rotating shaft 1312$a$ as a polishing member 1312$b$ (a polishing tool). The rotating tool 1312 is sandwiched and fixed by a fixing member 1311$a$ and a fixing member 1311$b$. The fixing member 1311$a$ and the fixing member 1311$b$ are configured by an aluminum alloy A5052 and have a system explained below. The fixing member 1311$a$ and the fixing member 1311$b$ are holding and screwing stationary dies by V blocks. The fixing member 1311$a$ and the fixing member 1311$b$ hold the rotating tool 1312 in V-shape grooves. Slip-stop rubber is stuck to contact sections of the fixing member 1311$a$ and the fixing member 1311$b$ with the rotating tool 1312 to prevent the rotating tool 1312 from moving.

When a control signal is input from the robot control device 1061, the robot 1100 shown in FIG. 13 brings the workpiece 1301 gripped by the hand 1220 into contact with the rotating polishing member 1312$b$ from an initial position (e.g., a position shown in FIG. 14). Since the workpiece 1301 is brought into contact with the polishing member 1312$b$, a sensor value of the force sensor 1230 is input to the control unit 1101. For example, when the sensor value is equal to or larger than a threshold set in advance, the control unit 1101 starts the impedance control. Consequently, the workpiece 1301 comes into contact with the polishing member 1312b with the predetermined pressing force. The surface of the workpiece 1301 is polished (machined) with a fixed polishing force. In a state in which the workpiece 1301 is set in contact with the polishing member 1312b, by moving the workpiece 1301, it is possible to draw a character on the surface of the workpiece 1301. If the predetermined pressing force set to a fixed value in advance is changed according to characters drawn on the workpiece 1301, it is possible to represent shading as a degree of polishing and draw the characters on the surface of the workpiece 1301. Note that, rather than starting the impedance control when the sensor value is equal to or larger than the threshold set in advance, it is also possible to steadily perform the impedance control even when the sensor value is 0.

Figure 15:
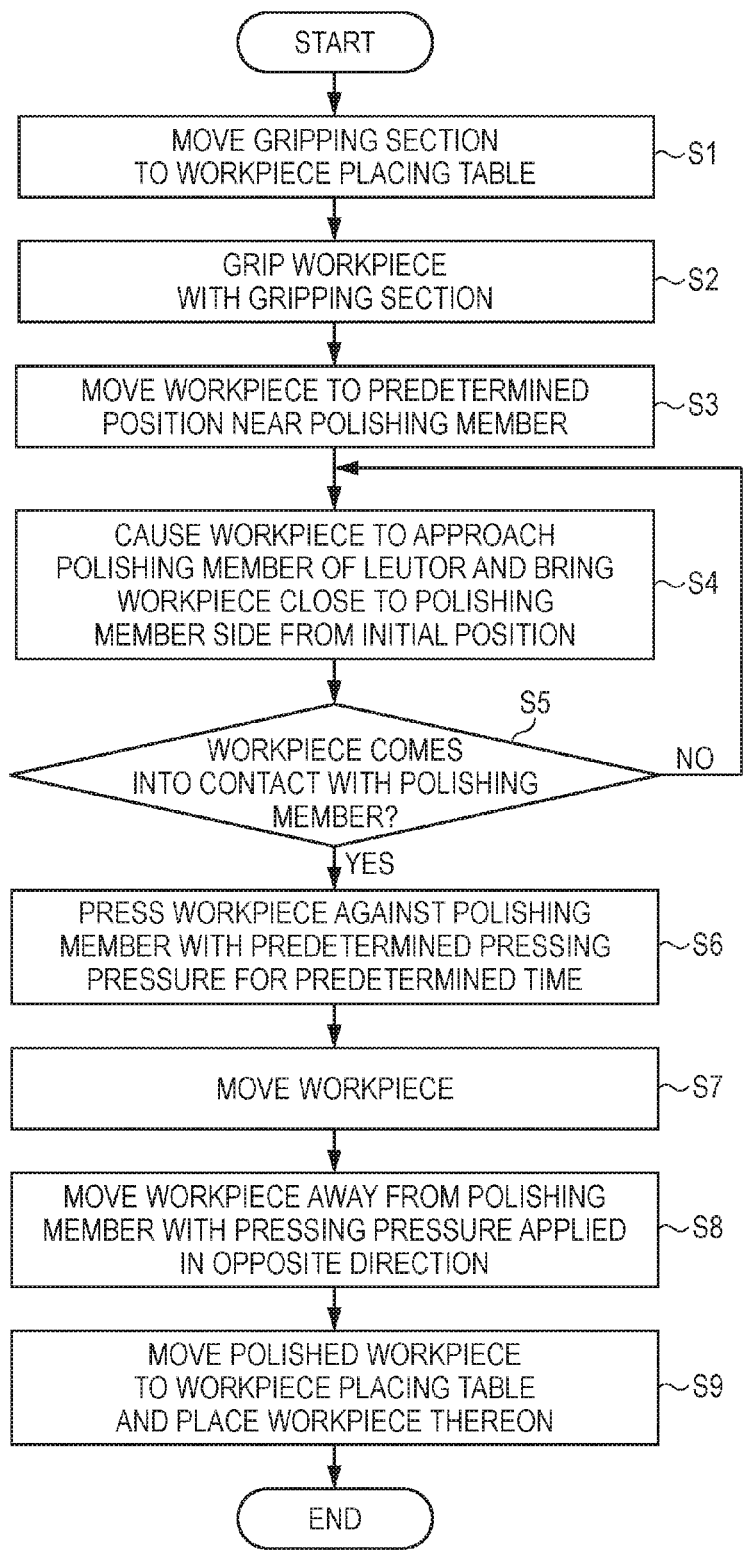
FIG. 15 is a flowchart for explaining processing of control by a robot control device shown in FIG. 13.

Processing performed when the robot system 1000 is applied to a polishing apparatus that polishes the surface of a workpiece is explained. FIG. 15 is a flowchart for explaining processing of control by the robot control device shown in FIG. 13.

When the user inputs a signal representing a start of work to the input unit 1103, the robot control device 1061 outputs a control signal to the robot 1100 and starts the processing shown in FIG. 15.

First, the robot 1100 moves the hand 1220 (the gripping section) to a workpiece placing table (step S1).

Subsequently, the robot 1100 grips a workpiece 1310 with the gripping section (step S2).

The robot 1100 moves the gripped workpiece 1301 to a predetermined position (an initial position) near the polishing member 1312b (step S3).

The robot 1100 causes the workpiece 1301 to approach the polishing member of the Leutor from the horizontal direction and brings the workpiece 1301 close to the polishing member side from the initial position (step S4).

The robot control device 1061 determines whether the workpiece 1301 comes into contact with the polishing member 1312b (step S5). The control unit 1101 performs this determination according to whether the sensor value of the force sensor 1230 is equal to or larger than the threshold set in advance. When the sensor value is equal to or larger than the threshold set in advance, the control unit 1101 determines that the workpiece 1301 comes into contact with the polishing member (YES in step S5). The processing proceeds to step S6. On the other hand, when the sensor value is smaller than the threshold set in advance, processing returns to step S4 (No in step S5). The control unit 1101 continues the processing in step S4 until the condition in step S5 is satisfied.

Subsequently, the robot 1100 presses the workpiece 1301 against the polishing member 1312b with the predetermined pressing force for a predetermined period (step S6). In step S6, the impedance control is performed and the surface of the workpiece 1301 is polished.

In a state in which the workpiece 1301 is in contact with the polishing member 1312b, the robot 1100 moves the workpiece 1301 (step S7). A character is drawn on the surface of the workpiece 1301.

The robot 1100 moves the workpiece 1301 away from the polishing member 1312b with a pressing force applied in the opposite direction (step S8).

Note that, thereafter, the robot 1100 may perform an operation for wiping polishing wastes adhering to the workpiece 1301. For example, when the robot 1100 is a single-arm robot, the robot 1100 places, with the hand 1220, the workpiece 1301 on a work bench other than the workpiece placing table 1302. The robot 1100 may grip sponge, cloth, or the like with the hand 1220 and apply the wiping operation to the workpiece 1301. Alternatively, the robot 1100 may place sponge, cloth, or the like on the work bench and rub the workpiece 1301 gripped by the hand 1220 against the placed sponge, cloth, or the like to thereby perform the wiping operation. When the robot 1100 is a double-arm robot, in a state in which the workpiece 1301 is gripped by the hand 1220 of one arm, the robot 1100 may grip sponge or the like with the hand 1220 of the other arm and perform the wiping operation for the workpiece 1301 gripped by the one hand 1220. During such a wiping operation, by controlling a force applied to the workpiece 1301 with the force control by the force sensor 1230, it is possible to remove polishing wastes from the surface of the workpiece 1301 without causing scratches and the like on the surface of the workpiece 1301 due to the polishing wastes.

Subsequently, the robot 1100 moves the polished workpiece 1301 to the workpiece placing table and places the workpiece 1301 on the workpiece placing table (step S9). Note that, when a plurality of characters are drawn on the workpiece surface, the processing returns to step S3 and the next character is drawn on the surface of the workpiece 1301.

As explained above, with the robot system 1000 according to this embodiment, the force sensor 1230 is provided in the robot 1100 itself rather than on the machining tool 1312 side. Consequently, the robot control device 1061 keeps a contact state with of the workpiece 1301 and the polishing member 1312b of the rotating tool 1312 according to an output value of the force sensor 1230 on which noise is not superimposed. Therefore, it is possible to accurately keep a force (a polishing force) applied to the workpiece 1301 fixed.

Consequently, in a state in which the workpiece 1301 is set in contact with the polishing member 1312b, by moving the workpiece 1301, it is possible to accurately draw a character on the surface of the workpiece 1301. If the predetermined pressing force set to the fixed value in advance is changed on the workpiece 1301 according to characters, it is possible to represent shading with a degree of polishing and draw a character on the surface of the workpiece 1301.

Fifth Embodiment (A Robot System)

Figure 16:
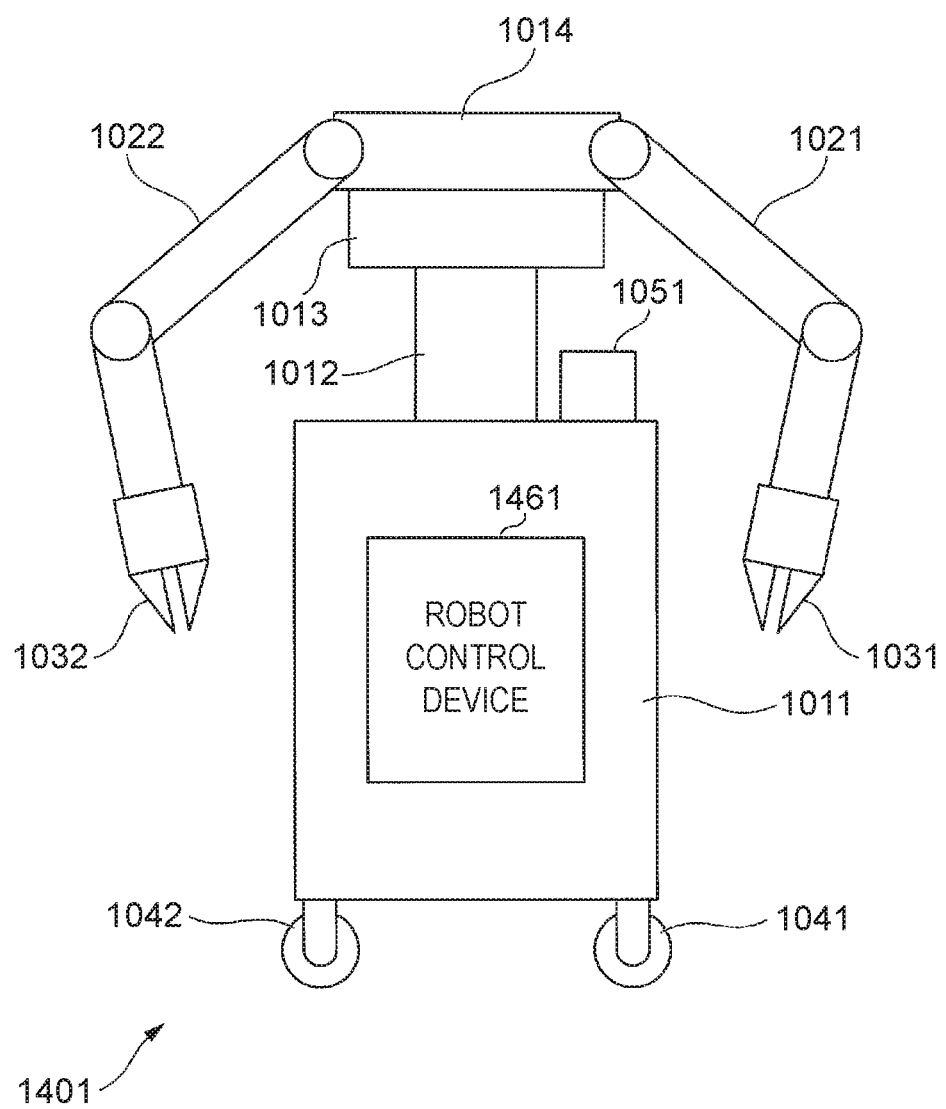
FIG. 16 is a diagram showing a schematic configuration example of a robot system according to a fifth embodiment of the invention.
Figure 17:
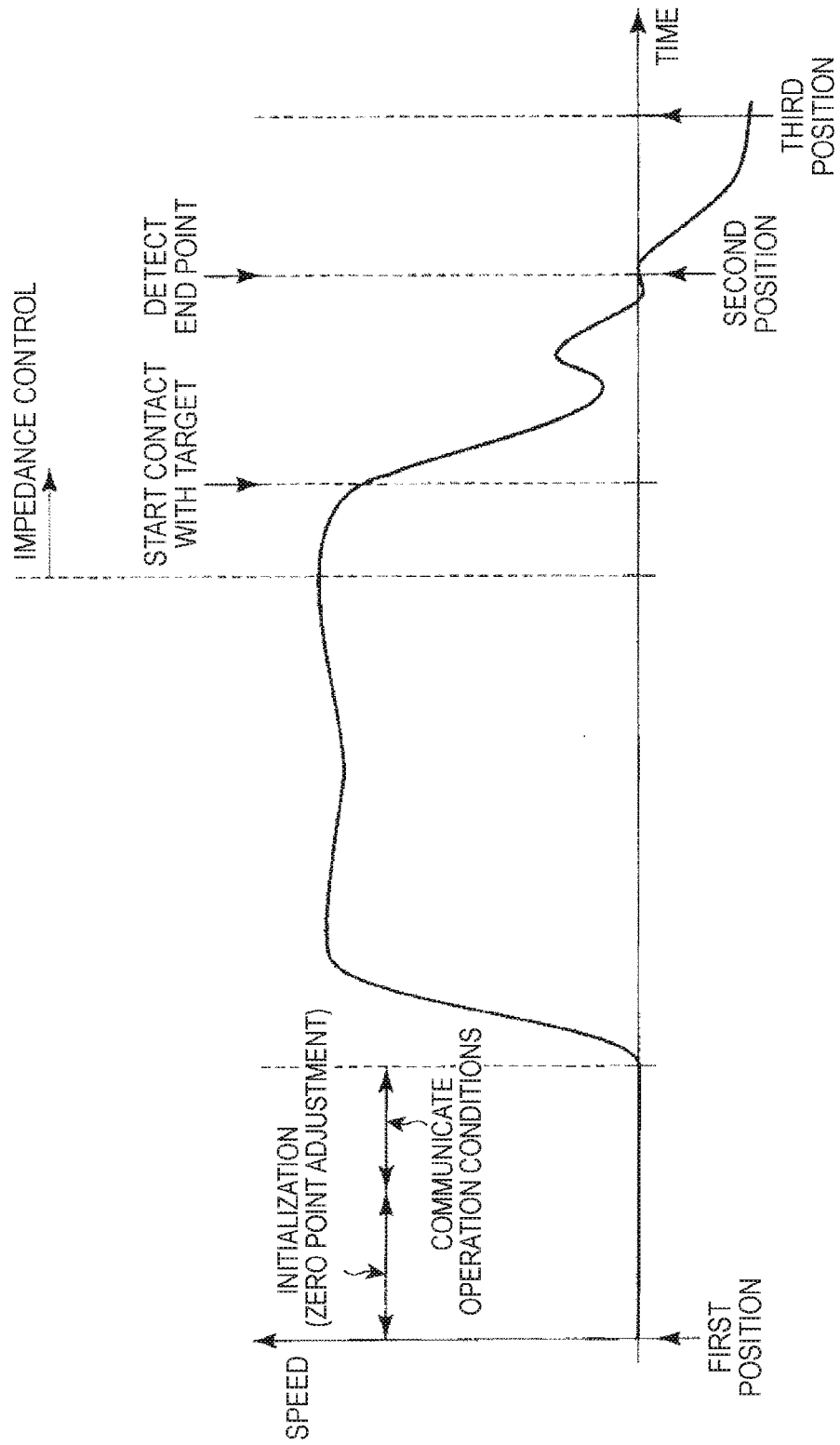
FIG. 17 is a timing chart showing the operation of a robot in the past in a period including a period of initialization of a force sensor.

FIG. 16 is a diagram showing a schematic configuration example of a robot system according to a fifth embodiment. A robot system 1401 according to this application example includes a robot control device 1461 and a robot (including the other components).

In this embodiment, the robot is a double-arm robot including two manipulators 1021 and 1022 respectively configuring arms. The robot is configured integrally with the robot control device 1461. The operation of the robot is controlled according to a control signal input from the robot control device 1461. The robot may output a signal indicating an own state or the like to the robot control device 1461.

On the upper surface of a housing section 1011, a body member 1012, a body member 1013, and a body member 1014 are attached on the upper side in order. The manipulator 1021 configuring the left arm is attached to the left side of the body member 1014 at the top. The manipulator 1022 configuring the right arm is attached to the right side of the body member 1014. A wheel 1041 is attached to the left side of the bottom surface of the housing section 1011. A wheel 1042 is attached to the right side of the bottom surface of the housing section 1011.

Note that the robot according to this embodiment is capable of rotating and moving the wheel 1041 on the left side and the wheel 1042 on the right side with an external force manually applied by a user or automatically with a device.

The robot control device 1461 is housed in the housing section 1011.

The manipulators 1021 and 1022 are respectively types of a vertical multi-joint robot and function as robot arms. The respective manipulators 1021 and 1022 include gripping sections 1031 and 1032 at the distal ends of thereof.

Note that a degree of freedom of the manipulators 1021 and 1022 may be an arbitrary degree of freedom, for example, a three-axis degree of freedom, a six-axis degree of freedom, a seven-axis degree of freedom, or other degrees of freedom.

The respective gripping sections 1031 and 1032 grip objects to be griped (targets).

In this embodiment, by causing the manipulators 1021 and 1022 (and the gripping sections 1031 and 1032) to operate, it is possible to move the targets gripped by the gripping sections 1031 and 1032, that is, change the positions and the postures of the targets.

The robot control device 1461 controls the manipulator 1021 (and the gripping section 1031) of the left arm and the manipulator 1022 (and the gripping section 1032) of the right arm. The robot control device 1461 and the manipulators 1021 and 1022 are connected to be capable of transmitting control signals and the like via, for example, a wired or wireless line.

Note that, for example, the robot control device 1461 may simultaneously control the manipulator 1021 (and the gripping section 1031) of the left arm and the manipulator 1022 (and the griping section 1032) of the right arm in association with each other or may control the manipulator 1021 (and the gripping section 1031) of the left arm and the manipulator 1022 (and the griping section 1032) of the right arm separately from each other.

Note that operations performed in the robot system 1401 according to this embodiment are schematically the same as the operations performed in the robot system 1000 according to the fourth embodiment shown in FIG. 13. Therefore, detailed explanation of the operations is omitted. For example, the polishing work may be performed using one of the gripping section 1031 and the gripping section 1032, may be performed in parallel using both of the gripping section 1031 and the gripping section 1032, or may be alternately performed by the right arm and the left arm.

The robot system 1401 according to this embodiment includes the griping section 1031 and the gripping section 1032. Therefore, if the robot system 1401 is applied to the polishing device explained with reference to FIGS. 14 and 15, it is possible to more efficiently perform the work for drawing a character on the workpiece.

Note that, with the robot system 1000 and the robot system 1401 according to the embodiments, complicated expensive peripheral devices are unnecessary. It is possible to easily perform contact work (searching, tracing, fitting, pressing, and the like of precision components). Anybody can easily perform automation of work monitoring, immediate graphical representation of a result, a visual operation check, and a program change.

The fourth and fifth embodiments are explained in detail above with reference to the drawings. However, a specific configuration is not limited to the embodiments. Design and the like not departing from the spirit of the invention are also included in the specific configuration.

For example, the rotating tool is explained as an example of the polishing device. However, the polishing device may be a polishing device that performs polishing through vibration (including ultrasonic vibration) rather than the polishing apparatus that performs polishing through rotation. That is, the polishing tool only has to be a vibrating or rotating object.

Note that it is also possible to record, in a computer-readable recording medium, a computer program for realizing the functions of any components in the devices explained above (e.g., the robot control device 1061 shown in FIG. 13 and the robot control device 1461 shown in FIG. 16) and cause a computer system to read and execute the program. It is assumed that the "computer system" includes an OS (Operating system) and hardware such as peripheral devices. The "computer-readable recording medium" means a portable medium such as a flexible disk, a magneto-optical disk, a ROM (Read Only Memory), or a CD (Compact Disk)-ROM or a storage device such as a hard disk incorporated in the computer system. Further, it is assumed that the "computer-readable recording medium" includes a recording medium that retains the computer program for a fixed time like a volatile memory (RAM: Random Access Memory) inside a computer system, which functions as a server or a client, when the computer program is transmitted via a network such as the Internet or a communication line such as a telephone line.

The computer program may be transmitted from a computer system that stores the computer program in a storage device or the like to another computer system via a transmission medium or by a transmission wave in the transmission medium. The "transmission medium" for transmitting the computer program means a medium having a function for transmitting information like a network (a communication network) such as the Internet or a communication line such as a telephone line.

The computer program may be a computer program for realizing a part of the functions explained above. Further, the computer program may be a computer program, a so-called differential file (a differential program), that can realize the functions in combination with a computer program already recorded in the computer system.

What is claimed is:

1. A robot comprising:
a robot arm;
a force sensor; and
a control unit configured to control an operation of the robot arm, wherein the control unit initializes the force sensor while the robot arm is moving at a uniform speed, and the uniform speed is based on an absolute value of a difference between a maximum speed and a minimum speed, and the difference between the maximum speed and the minimum speed is less than or equal 2 mm/sec.

2. The robot according to claim 1, wherein the control unit initializes the force sensor while the robot arm is moving at the uniform speed and an amplitude of a detection value of the force sensor is smaller than a threshold, wherein the threshold is less than or equal 10 N.

3. The robot according to claim 2, wherein the control unit initializes the force sensor while the robot arm is moving at the uniform speed and when the amplitude of the detection value of the force sensor is smaller than the threshold.

4. The robot according to claim 1, wherein:
the force sensor is provided in the robot arm, and
the control unit determines on the basis of speed of a part of the robot arm in which the force sensor is provided whether the robot arm is moving at the uniform speed.

5. The robot according to claim 1, wherein the control unit determines on the basis of speed of a distal end section of the robot arm whether the robot arm is moving at the uniform speed.

6. A robot system comprising:
a robot including a robot arm and a force sensor; and
a control unit configured to control an operation of the robot arm, wherein
the control unit initializes the force sensor while the robot arm is moving at uniform speed, and the uniform speed is based on an absolute value of a difference between a maximum speed and a minimum speed, and the difference between the maximum speed and the minimum speed is less than or equal 2 mm/sec.

7. A robot control device that controls an operation of a robot including a robot arm and a force sensor, wherein: the robot control device initializes the force sensor while the robot arm is moving at uniform speed, and the uniform speed is based on an absolute value of a difference between a maximum speed and a minimum speed, and the difference between the maximum speed and the minimum speed is less than or equal 2 mm/sec.

* * * * *